US011915639B2

(12) United States Patent
Kim et al.

(10) Patent No.: US 11,915,639 B2

(45) Date of Patent: Feb. 27, 2024

(54) DISPLAY DEVICE AND METHOD FOR DRIVING THE SAME

(71) Applicant: Samsung Display Co., Ltd., Yongin-si (KR)

(72) Inventors: Taehoon Kim, Yongin-si (KR); Seon Young Choi, Yongin-si (KR); Sangan Kwon, Yongin-si (KR); Soon-Dong Kim, Yongin-si (KR); Jin-Wook Yang, Yongin-si (KR); Changnoh Yoon, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/108,626

(22) Filed: Feb. 12, 2023

(65) Prior Publication Data

US 2024/0005846 A1 Jan. 4, 2024

(30) Foreign Application Priority Data

Jun. 30, 2022 (KR) ........................ 10-2022-0080395

(51) Int. Cl.
*G09G 3/32* (2016.01)

(52) U.S. Cl.
CPC ....... *G09G 3/32* (2013.01); *G09G 2310/0267* (2013.01); *G09G 2330/021* (2013.01); *G09G 2380/02* (2013.01)

(58) Field of Classification Search
CPC ............. G09G 3/32; G09G 2310/0267; G09G 2330/021; G09G 2380/02
See application file for complete search history.

(56) References Cited

U.S. PATENT DOCUMENTS

| | | | | |
|---|---|---|---|---|
| 9,653,014 | B2 * | 5/2017 | Hwang | G09G 3/2022 |
| 9,933,819 | B2 * | 4/2018 | Kim | G06F 3/0412 |
| 10,133,310 | B2 * | 11/2018 | Kim | G06F 3/147 |
| 10,152,088 | B2 * | 12/2018 | Ka | G06F 1/1686 |
| 10,319,291 | B2 * | 6/2019 | Ikeda | G09G 3/2092 |
| 10,360,876 | B1 * | 7/2019 | Rahman | G09G 5/14 |
| 10,379,720 | B2 * | 8/2019 | Ryu | G06F 3/04845 |
| 10,542,128 | B2 * | 1/2020 | Kang | H04M 1/02 |

(Continued)

FOREIGN PATENT DOCUMENTS

| | | |
|---|---|---|
| KR | 1020210013477 A | 2/2021 |
| KR | 1020210050626 A | 5/2021 |

*Primary Examiner* — Vinh T Lam

(74) *Attorney, Agent, or Firm* — CANTOR COLBURN LLP

(57) ABSTRACT

A display panel of a display device is divided into a first display region and a second display region. The second display region includes a boundary region adjacent to the first display region and a non-boundary region opposite to the first display region with respect to the boundary region. The driving controller outputs the voltage control signal, such that the first voltage in a first high voltage level and the second voltage in a first low voltage level are generated when the first display region is driven. The driving controller outputs the voltage control signal, such that the first voltage in a second high voltage level lower than the first high voltage level and the second voltage in a second low voltage level higher than the first low voltage level are generated, when the non-boundary region of the second display region is driven.

20 Claims, 21 Drawing Sheets

(56) References Cited

U.S. PATENT DOCUMENTS 10,636,378 B2 * 4/2020 Wu .................... G09G 3/3696
11,049,451 B2 6/2021 Park et al.
11,100,900 B2 * 8/2021 Park .................... G09G 3/3258
11,120,714 B2 * 9/2021 Lee .................... G02F 1/136259
11,132,087 B2 * 9/2021 Lee .................... G06F 3/0443
11,183,107 B2 * 11/2021 Chun .................... G09G 3/035
11,195,468 B2 12/2021 Park et al.
11,210,050 B2 * 12/2021 Ko .................... G06F 1/1652
11,217,178 B2 * 1/2022 Oh .................... G09G 3/3233
11,282,459 B2 * 3/2022 Park .................... G09G 3/3233
11,315,457 B2 * 4/2022 Kwon .................... G09G 3/3266
11,341,933 B2 * 5/2022 Shin .................... G09G 3/035
11,380,268 B2 * 7/2022 Park .................... G09G 3/3266
11,388,329 B1 * 7/2022 Qiao .................... G02B 6/08
11,392,232 B2 * 7/2022 Yamazaki .................... G06F 3/044
11,417,257 B2 * 8/2022 You .................... G09G 3/3233
11,417,265 B2 * 8/2022 Seo .................... G09G 3/035
11,423,843 B2 * 8/2022 Kim .................... G09G 3/3233
11,450,251 B2 * 9/2022 Seo .................... G09G 3/035
11,481,003 B2 * 10/2022 Cho .................... G06F 1/1652
11,501,682 B2 * 11/2022 Yun .................... G06F 1/1677
11,508,313 B2 * 11/2022 Yoon .................... G09G 3/3266
11,538,379 B2 * 12/2022 Liu .................... G09G 3/3233
11,580,886 B2 * 2/2023 Kwon .................... G09G 3/3258
11,600,689 B2 * 3/2023 Zhang .................... G09G 3/3225
11,636,789 B2 * 4/2023 Dong .................... G09G 3/3233
345/214
2015/0227173 A1 * 8/2015 Hwang .................... G06F 1/1652
345/619
2015/0338888 A1 * 11/2015 Kim .................... G06F 1/1643
345/156
2020/0365827 A1 * 11/2020 Yamazaki .................... G09G 5/14
2021/0201813 A1 * 7/2021 Oh .................... G09G 3/3266
2022/0148503 A1 * 5/2022 Seo .................... G09G 3/3283
2022/0197584 A1 * 6/2022 Zheng .................... G06F 1/1641
2022/0269463 A1 * 8/2022 Yu .................... G09G 3/035
2022/0276680 A1 * 9/2022 Liang .................... G06F 1/1652
2022/0319440 A1 * 10/2022 Lee .................... G09G 3/035
2022/0351659 A1 * 11/2022 Kwon .................... G09G 3/3266
2022/0375400 A1 * 11/2022 Kim .................... G09G 5/391
2023/0104904 A1 * 4/2023 Kim .................... G09G 3/3258
345/204
2023/0125943 A1 * 4/2023 Lee .................... H10K 59/88
345/204
2023/0162655 A1 * 5/2023 Choi .................... G09G 3/3233
345/690
2023/0178003 A1 * 6/2023 Kim .................... G09G 3/3233
345/55
2023/0178028 A1 * 6/2023 Jung .................... G09G 5/10
345/691

* cited by examiner

| Line # | VGH |
|---|---|
| L1 | VH1 |
| ⋮ | ⋮ |
| Lk | VH1 |
| Lk+1 | VH1−Vo1 |
| Lk+2 | VH1−Vo2 |
| Lk+3 | VH1−Vo3 |
| Lk+4 | VH1−Vo4 |
| Lk+5 | VH1−Vo5 |
| Lk+6 | VH1−Vo6 |
| Lk+7 | VH1−Vo7 |
| Lk+8 | VH1−Vo8 |
| Lk+9 | VH1−Vo9 |
| Lk+10 | VH1−Vo10 |
| Lk+11 | VH1−Vo11 |
| Lk+12 | VH12Vo12 |
| Lk+13 | VH1−Vo13 |
| Lk+14 | VH1−Vo14 |
| Lk+15 | VH1−Vo15 |
| Lk+16 | VH1−Vo16 |
| Lk+17 | VH2 |
| ⋮ | ⋮ |
| Ln | VH2 |

DISPLAY DEVICE AND METHOD FOR DRIVING THE SAME

This application claims priority to Korean Patent Application No. 10-2022-0080395 filed on Jun. 30, 2022, and all the benefits accruing therefrom under 35 U.S.C. § 119, the content of which in its entirety is herein incorporated by reference.

BACKGROUND

1. Field

Embodiments of the present disclosure described herein relate to a display device.

2. Description of the Related Art

An electronic device, such as a smart phone, a digital camera, a notebook computer, a navigation system, a monitor, and a smart television, that provide an image to a user include a display device to display the image. The display device generates an image and provides the generated image to the user through a display screen.

The display device includes a plurality of pixels and driving circuits to control the plurality of pixels. Each of the plurality of pixels includes a light emitting device and a pixel circuit to control the light emitting device. The pixel circuit may include a plurality of transistors systematically connected to one another.

The display device may apply a data signal to a display panel. When a current corresponding to the data signal is supplied to the light emitting device, the display device may display a specific image.

A desired image may be displayed by adjusting an amount of current supplied to the light device. The pixel circuit may receive driving voltages to provide a current to the light emitting device.

As the display device is used in various use fields, mutually different images may be displayed on one display device.

SUMMARY

Embodiments of the disclosure provide a display device capable of reducing power consumption and preventing display quality from deteriorated, and a method for driving the same.

In an embodiment of the disclosure, a display device includes: a display panel including a plurality of pixels, a driving controller to receive an input image signal and a control signal, and to output a voltage control signal, a voltage generator to generate a first voltage and a second voltage in response to the voltage control signal, and a scan driving circuit to receive the first voltage and the second voltage and to provide a plurality of scan signals to the plurality of pixels. The display panel is divided into a first display region, which is driven at a first operating frequency, and a second display region which is driven at a second operating frequency. The second display region includes a boundary region adjacent to the first display region and a non-boundary region opposite to the first display region with respect to the boundary region.

The driving controller outputs the voltage control signal, such that the first voltage in a first high voltage level and the second voltage in a first low voltage level are generated when the first display region is driven. The driving controller outputs the voltage control signal, such that the first voltage in a second high voltage level lower than the first high voltage level and the second voltage in a second low voltage level higher than the first low voltage level are generated, when the non-boundary region of the second display region is driven. The driving controller outputs the voltage control signal to generate the first voltage in a third high voltage level between the first high voltage level and the second high voltage level, and the second voltage in a third low voltage level between the first low voltage level and the second low voltage level, when the boundary region of the second display region is driven.

In an embodiment, the scan driving circuit may output the plurality of scan signals swinging between the first voltage and the second voltage, when the first display region is driven.

In an embodiment, the scan driving circuit may output the plurality of scan signals in the third low voltage level when the boundary region of the second display region is driven, and output the plurality of scan signals in the second low voltage level, when the non-boundary region of the second display region is driven.

In an embodiment, the boundary region may include 'Y' number of horizontal lines of pixels of the plurality of pixels ('Y' is a positive integer) from a first horizontal line to a Y-th horizontal line disposed sequentially from a position adjacent to the first display region, the third high voltage level of the first voltage may be provided in plurality, the third low voltage level of the second voltage may be provided in plurality, and the driving controller may output the voltage control signal to generate the first voltage having the third high voltage levels mutually different from each other from the first horizontal line to the Y-th horizontal line, and the second voltage having the third low voltage levels mutually different from each other from the first horizontal line to the Y-th horizontal line.

In an embodiment, the third high voltage levels of the first voltage may be decreased stepwise from the first horizontal line to the Y-th horizontal line.

In an embodiment, the third low voltage levels of the second voltage may be increased stepwise from the first horizontal line to the Y-th horizontal line.

In an embodiment, the first horizontal line to the Y-th horizontal line may correspond to Y number of offset voltages, respectively, and the third high voltage levels from the first horizontal line to the Y-th horizontal line may each correspond to difference between the first high voltage level and a corresponding offset voltage of the Y number of offset voltages.

In an embodiment, some offset voltages of the 'Y' number of offset voltages may correspond to 0 volt (V).

In an embodiment, the driving controller may include an operating mode determiner to determine an operating mode based on the input image signal and the control signal, and to output a mode signal, and a signal generator to output an output image signal, and the voltage control signal, in response to the input image signal, the control signal, and the mode signal.

In an embodiment, the signal generator may output a scan control signal to drive scan signals, which correspond to the first display region, of the plurality of scan signals at the first operating frequency, and to drive scan signals, which correspond to the second display region, of the plurality of scan signals, at the second operating frequency, when the mode signal indicates a multi-frequency mode, and the scan driving circuit may provide the plurality of scan signals to the plurality of pixels, in response to the scan control signal.

In an embodiment, a display device includes: a display panel including a plurality of pixels, a driving controller to receive an input image signal and a control signal, and to output a voltage control signal, a voltage generator to generate a first voltage and a second voltage in response to the voltage control signal, and a scan driving circuit to receive the first voltage and the second voltage and to provide a plurality of scan signals to the plurality of pixels, the display panel is divided into a first display region driven at a first operating frequency and a second display region driven at a second operating frequency, the driving controller outputs the voltage control signal, to generate the first voltage in a first high voltage level and the second voltage in a first low voltage level are generated, when the first display region is driven, the driving controller outputs the voltage control signal, to generate the first voltage in the first high voltage level and the second voltage in the first low voltage level, when a first horizontal line to an A-th horizontal line of pixels of the plurality of pixels ('A' is a positive integer) in the second display region are driven, the driving controller outputs the voltage control signal, to generate the first voltage in a second high voltage level and the second voltage in a second low voltage level, when an (A+1)-th horizontal line to an n-th horizontal line ('n' is a positive integer, A<n) in the second display region are driven, and the 'A' is changed at every frame.

In an embodiment, the scan driving circuit may output the plurality of scan signals swinging between the first voltage and the second voltage, when the first display region is driven.

In an embodiment, the second high voltage level may be lower than the first high voltage level, and the second low voltage level may be higher than the first low voltage level.

In an embodiment, the driving controller may include an operating mode determiner to determine an operating mode based on the input image signal and the control signal, and to output a mode signal, and a signal generator to output an output image signal, and the voltage control signal, in response to the input image signal, the control signal, and the mode signal.

In an embodiment, the second display region may include a boundary region adjacent to the first display region and a non-boundary region opposite to the first display region with respect to the boundary region.

In an embodiment, the signal generator may include a random number generator to generate the 'A', and the boundary region may include the 'n' number of horizontal lines.

In an embodiment, the signal generator may include a look-up table to store the 'A' corresponding to each of a plurality of frames, and the boundary region may include the 'n' number of horizontal lines.

In an embodiment, a method for driving a display device, includes driving a first display region of a display panel, at a first operating frequency during a multi-frequency mode, and driving a second display region adjacent to the first display region, at a second operating frequency during the multi-frequency mode, generating a first voltage in a first high voltage level and a second voltage in a first low voltage level, when the first display region is driven, generating the first voltage in the first high voltage level and the second voltage in the first low voltage level, when a first horizontal line to an A-th horizontal line of pixels ('A' is a positive integer) in the second display region are driven, generating the first voltage in a second high voltage level and the second voltage in a second low voltage level, when an (A+1)-th horizontal line to an n-th horizontal line ('n' is a positive integer, A<n) in the second display region are driven, generating a scan signal based on the first voltage and the second voltage, and providing the scan signal to the display panel. The 'A' is changed at every frame.

In an embodiment, the second high voltage level may be lower than the first high voltage level, and the second low voltage level may be higher than the first low voltage level.

In an embodiment, the second display region may include a boundary region adjacent to the first display region and a non-boundary region opposite to the first display region with respect to the boundary region, and the boundary region may include the 'n' number of horizontal lines.

BRIEF DESCRIPTION OF THE DRAWING

The above and other embodiments and features of the disclosure will become apparent by describing in detail embodiments thereof with reference to the accompanying drawings.

DETAILED DESCRIPTION

Figure 1:
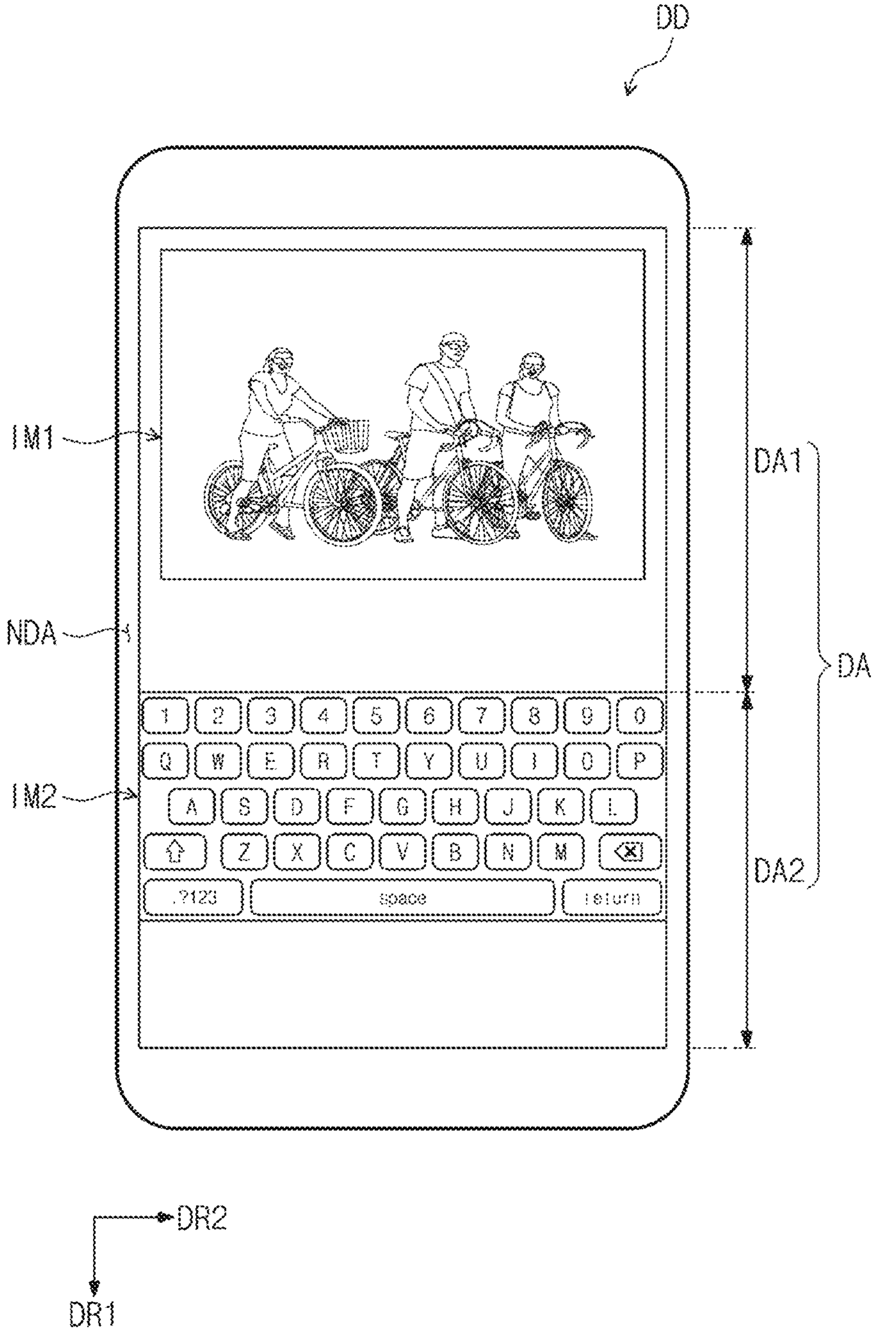
FIG. 1 is a plan view of an embodiment of a display device according to the disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral refers to the same component. In addition, in drawings, thicknesses, proportions, and dimensions of components may be exaggerated to describe the technical features effectively. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes any and all combinations of one or more of associated components Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a plan view of an embodiment of a display device, according to the disclosure.

Referring to FIG. 1, a portable terminal is illustrated as an example of a display device DD according to an embodiment of the present disclosure. The portable terminal may include a tablet PC, a smartphone, a personal digital assistant ("PDA"), a portable multimedia player ("PMP"), a game console, and a wristwatch-type electronic device. However, the present disclosure is not limited thereto. The present disclosure may be used for small and medium-size electronic devices, such as a personal computer, a notebook computer, a kiosk, a car navigation unit, and a camera, in addition to large-size electronic equipment, such as a television or an outside billboard. The above examples are provided only as an embodiment, and it is obvious that the display device DD may be applied to any other electronic device(s) without departing from the concept of the present disclosure.

As illustrated in FIG. 1, a display surface for displaying a first image IM1 and a second image IM2 is parallel to a plane defined by a first direction DR1 and a second direction DR2. The display device DD includes a plurality of regions separated on a display surface. The display surface includes a display region DA for displaying the first image IM1 and the second image IM2, and a non-display region NDA adjacent to the display region DA. The non-display region NDA may be referred to as a bezel region. For example, the display region DA may have a rectangular shape. The non-display region NDA surrounds the display region DA. In addition, although not illustrated, for example, the display device DD may include a partially-curved shape. As a result, one region of the display region DA may have a curved shape.

The display region DA of the display device DD includes a first display region DA1 and a second display region DA2. In a specific application program, the first image IM1 may be displayed in the first display region DA1, and the second image IM2 may be displayed in the second display region DA2. For example, the first image IM1 may be a moving picture, and the second image IM2 may be a still image or an image (e.g., a keypad for operating game, or text information) having a longer change period.

According to an embodiment, the display device DD may drive the first display region DA1 for displaying the video at a first operating frequency higher than or equal to a reference frequency (or a normal frequency), and may drive the second display region DA2 for displaying a still image, at a second operating frequency lower than the reference frequency. The display device DD may reduce power consumption by reducing the operating frequency for the second display region DA2.

The size of each of the first display region DA1 and the second display region DA2 may be a preset size, and may be changed by an application program. According to an embodiment, when the still image is displayed in the first display region DA1 and the video is displayed in the second display region DA2, the first display region DA1 may be driven at the second operating frequency lower than the reference frequency, and the second display region DA2 may be driven at the first operating frequency higher than or equal to the reference frequency. In addition, the display region DA may be divided into three or more display regions. An operating frequency of each of the display regions may be determined depending on the type (for example, a still image or video) of an image displayed in each of the display regions.

Figure 2A:
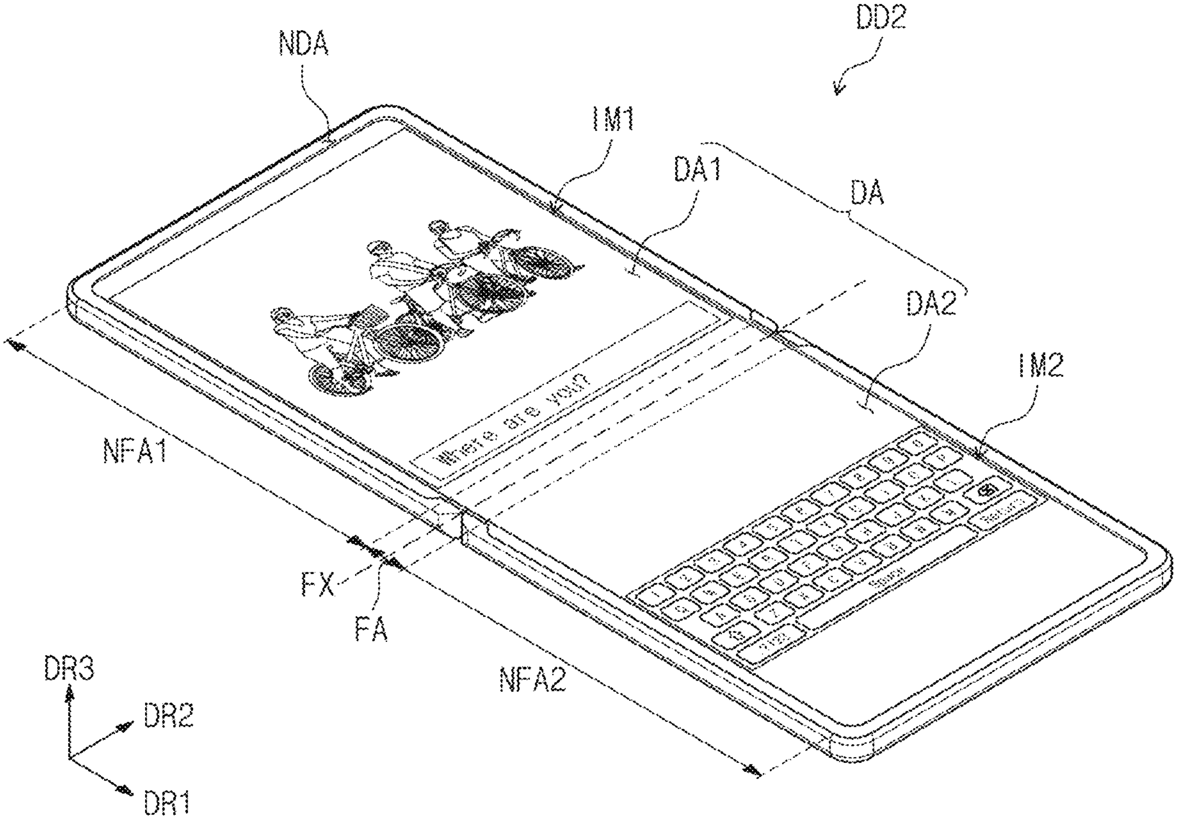
FIGS. 2A and 2B are perspective views of a display device, according to an embodiment of the present disclosure.
Figure 2B:
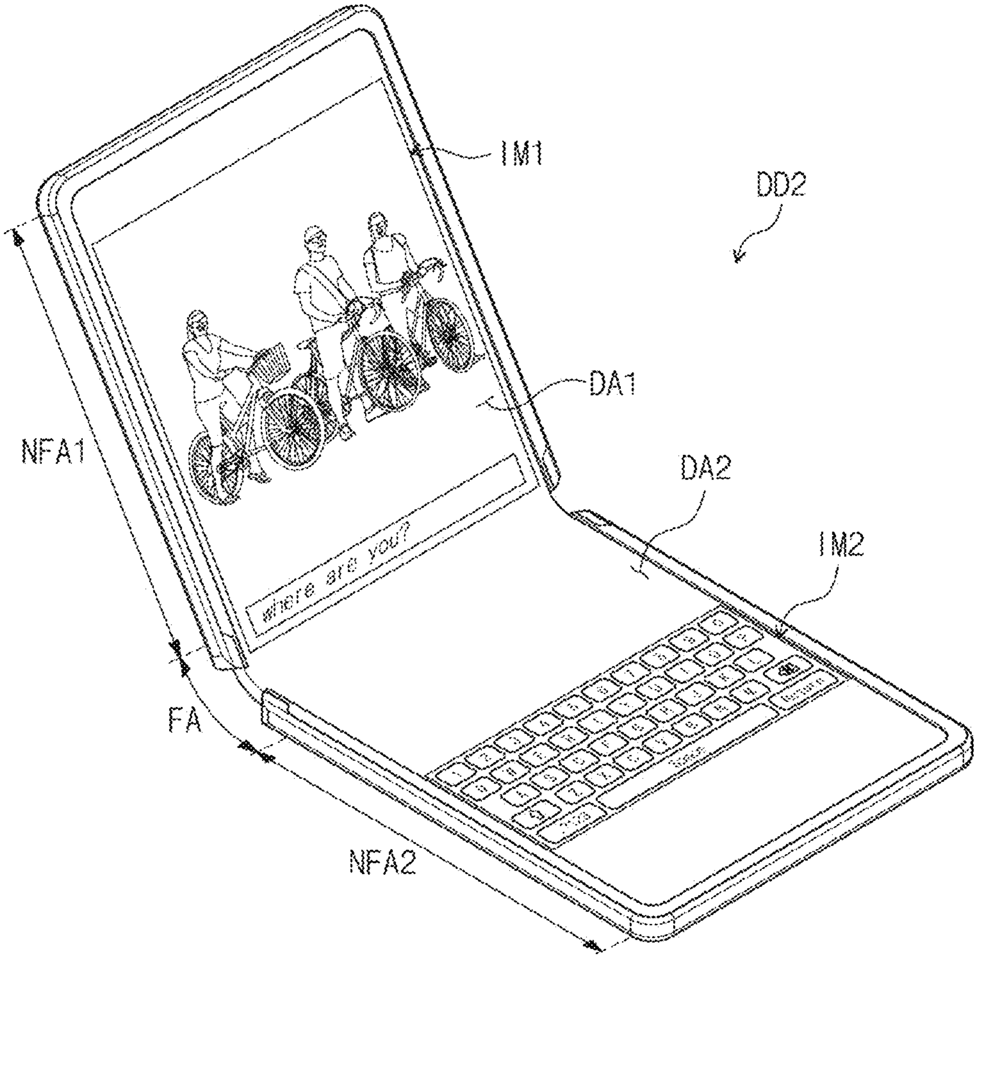

FIGS. 2A and 2B are perspective views of a display device DD2, according to an embodiment of the present disclosure. FIG. 2A illustrates a state (hereinafter, an unfolding state) in which the display device DD2 is unfolded, and FIG. 2B illustrates a state (hereinafter, a folding state) in which the display device DD2 is folded.

As illustrated in FIGS. 2A and 2B, the display device DD2 includes the display region DA and the non-display region NDA. The display device DD2 may display an image through the display region DA. The display region DA may include a plane defined by the first direction DR1 and the second direction DR2, in the unfolding state. The thickness direction of the display device DD2 may be parallel to a third direction DR3 crossing the first direction DR1 and the second direction DR2. Accordingly, front surfaces (or top surfaces) and back surfaces (or bottom surfaces) of members constituting the display device DD2 may be defined based on the third direction DR3. For example, the display region DA may have a rectangular shape. The non-display region NDA surrounds the display region DA.

The display region DA may include a first non-folding region NFA1, a folding region FA, and a second non-folding region NFA2. The folding region FA may be bent about a folding axis FX extending in the second direction DR2.

When the display device DD2 is folded, the first non-folding region NFA1 and the second non-folding region NFA2 may face each other. Accordingly, when the display device DD2 is fully folded, the display region DA may not be exposed to the outside, which may be referred to as "in-folding". However, this is provided only for the illustrated purpose, and the operation of the display device DD2 is not limited thereto.

According to an embodiment of the present disclosure, when the display device DD2 is folded, the first non-folding region NFA1 and the second non-folding region NFA2 may be opposite to each other. Accordingly, when the display device DD2 is folded, the first non-folding region NFA1 may be exposed to the outside, which may be referred to as "out-folding".

The display device DD2 may perform only any one of an in-folding operation or an out-folding operation. Alternatively, the display device DD2 may perform both the in-folding operation and the out-folding operation. In this case, the same region of the display device DD2, for example, the folding region FA may be in-folded and out-folded. Alternatively, some regions of the display device DD2 may be in-folded, and other regions of the display device DD may be out-folded.

One folding region and two non-folding regions are illustrated in FIGS. 2A and 2B, but the number of folding regions and the number of non-folding regions are not limited thereto. For another example, the display device DD2 may include more than two non-folding regions, and a plurality of folding regions interposed between adjacent non-folding regions.

FIGS. 2A and 2B illustrate that the folding axis FX is parallel to the shorter axis of the display device DD2. However, the present disclosure is not limited thereto. For another example, the folding axis FX may extend in a direction parallel to the longer axis of the display device DD2, for example, the first direction DR1.

FIGS. 2A and 2B illustrate that the first non-folding region NFA1, the folding region FA, and the second non-folding region NFA2 may be sequentially arranged in the first direction DR1. However, the present disclosure is not limited thereto. For another example, the first non-folding region NFA1, the folding region FA, and the second non-folding region NFA2 may be sequentially arranged in the first direction DR1.

The plurality of display regions DA1 and DA2 may be defined in the display region DA of the display device DD2. Although FIG. 2A illustrates the two display regions DA1 and DA2, the number of display regions DA1 and DA2 is not limited thereto.

The plurality of display regions DA1 and DA2 may include the first display region DA1 and the second display region DA2. For example, the first display region DA1 may be a region to display the first image IM1, and the second display region DA2 may be a region to display the second image IM2. For example, the first image IM1 may be a moving picture, and the second image IM2 may be a still image or an image (e.g., a keypad for operating game, or text information) having a longer change period.

The display device DD2 according to an embodiment may operate variously depending on an operating mode. The operating mode may include a single-frequency mode and a multi-frequency mode. The display device DD2 may drive the first display region DA1 and the second display region DA2 at a reference frequency, during the single-frequency mode. According to an embodiment, the display device DD2 may drive the first display region DA1 to display the first image IM1, at the first operating frequency, and drive the second display region DA2 to display the second image IM2 at a second operating frequency lower than the first operating frequency, during the multi-frequency mode. According to an embodiment, the first operating frequency may be equal to or higher than the reference frequency.

The size of each of the first display region DA1 and the second display region DA2 may be preset, and may be changed by an application program. According to an embodiment, the first display region DA1 may correspond to the first non-folding region NFA1, and the second display region DA2 may correspond to the second non-folding region NFA2. In addition, a first portion of the folding region FA may correspond to the first display region DA1, and a second portion of the folding region FA may correspond to the second display region DA2.

According to an embodiment, the entire portion of the folding region FA may correspond to only any one of the first display region DA1 and the second display region DA2.

According to an embodiment, the first display region DA1 may correspond to a first portion of the first non-folding region NFA1, and the second display region DA2 may correspond to a second portion of the first non-folding region NFA1, the folding region FA, and the second non-folding region NFA2. In other words, an area of the second display region DA2 may be wider than an area of the first display region DA1.

According to an embodiment, the first display region DA1 may correspond to the first non-folding region NFA1, the folding region FA, and a first portion of the second non-folding region NFA2, and the second display region DA2 may correspond to a second portion of the second non-folding region NFA2. In other words, the area of the first display region DA1 may be wider than an area of the second display region DA2.

As illustrated in FIG. 2B, the first display region DA1 may correspond to the first non-folding region NFA1, and the second display region DA2 may correspond to the second non-folding region NFA2, in the state that the folding region FA is folded.

Although FIGS. 2A and 2B illustrate the display device DD2 including one folding region, by way of example, the present disclosure is not limited thereto. For another example, the present disclosure may be applied to a display device having two or more folding regions, a rollable display device, or a slidable display device.

The following description will be made while focusing on the display device DD illustrated in FIG. 1, but the description will be identically applied to the display device DD2 illustrated in FIGS. 2A and 2B.

Figure 3A:
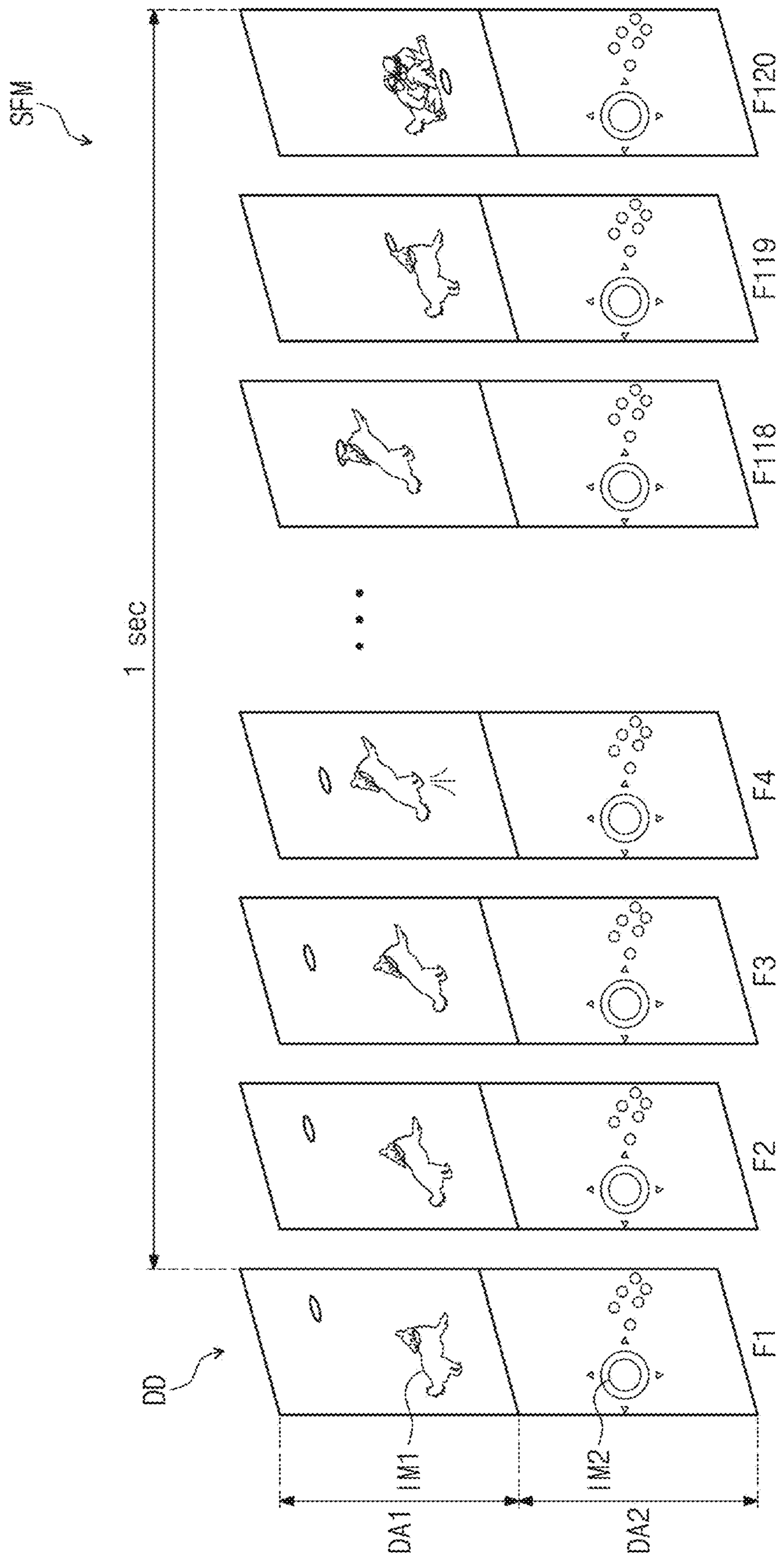
FIG. 3A is a view illustrating the operation of a display device in a single-frequency mode.
Figure 3B:
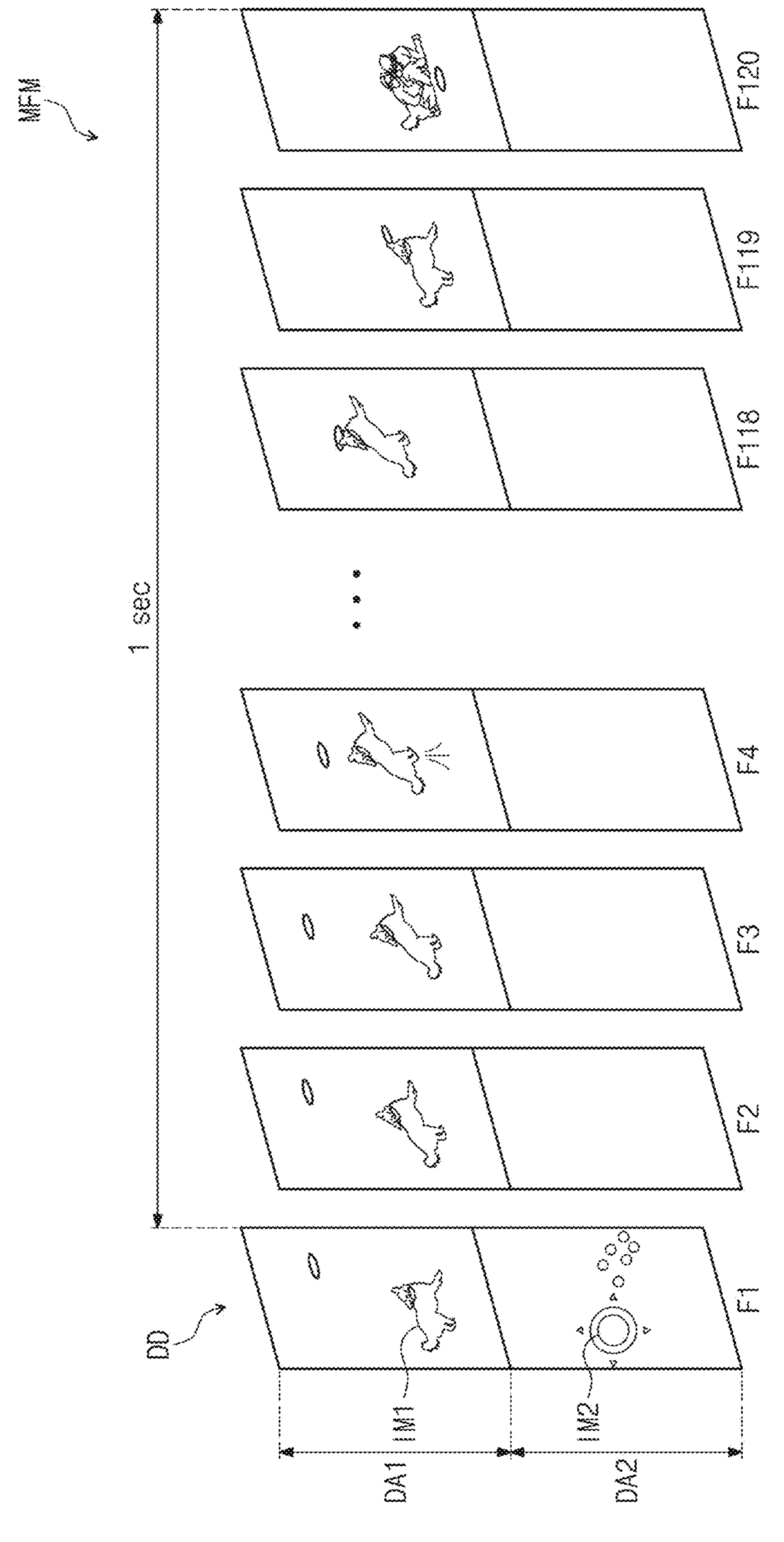
FIG. 3B is a view illustrating the operation of a display device in a multi-frequency mode.

FIG. 3A is a view illustrating the operation of a display device in a single-frequency mode. FIG. 3B is a view illustrating the operation of a display device in a multi-frequency mode.

Referring to FIG. 3A, the first image IM1 displayed in the first display region DA1 may be a moving picture. The second image IM2 displayed in the second display region DA2 may be a still image or an image (e.g., a keypad for manipulating a game) having a long change period.

Although FIG. 1 illustrates that the first image IM1 displayed in the first display region DA1, and the second image IM2 displayed in the second display region DA2 are provided only for the illustrative purpose, various images may be displayed on the display device DD.

In the single-frequency mode SFM, each of the first display region DA1 and the second display region DA2 of the display device DD may be driven at the first operating frequency. For example, the first operating frequency may be 120 Hertz (Hz). When the first operating frequency is 120 Hz, images of the first frame F1 to the 120-th frame F120 may be displayed in the first display region DA1 and the second display region DA2 for one second.

Referring to FIG. 3B, the display device DD may set an operating frequency for the first display region DA1 to display the first image IM1, which is a moving picture, to the first operating frequency, and may set an operating frequency of the second display region DA2 to display the second image IM2 (which is a still image) to the second operating frequency lower than the first operating frequency, in the multi-frequency mode MFM. The first operating frequency may be 120 Hz, and the second operating frequency may be 1 Hz. The first operating frequency and the second operating frequency may be varied. For example, when the reference frequency is 120 Hz, the first operating frequency may be 120 Hz equal to the reference frequency or 144 Hz higher than the reference frequency, and the second operating frequency may be either 60 Hz, 30 Hz, 15 Hz, 10 Hz, or 1 Hz, which is lower than the reference frequency.

In the multi-frequency mode MFM, when the first operating frequency is 120 Hz and the second operating frequency is 1 Hz, the first image IM1 is displayed, at the first frame F1 to the 120-th frame F120, in the first display region DA1 of the display device DD for one second. The second image IM2 may be displayed at only the first frame F1 in the second display region DA2, and any image may not be displayed in the remaining frames F2 to F120. According to an embodiment, the same image as that of the first frame F1 may be repeatedly displayed, at the second frame F2 to the 120-th frame F12, on the second display region DA2.

Figure 4:
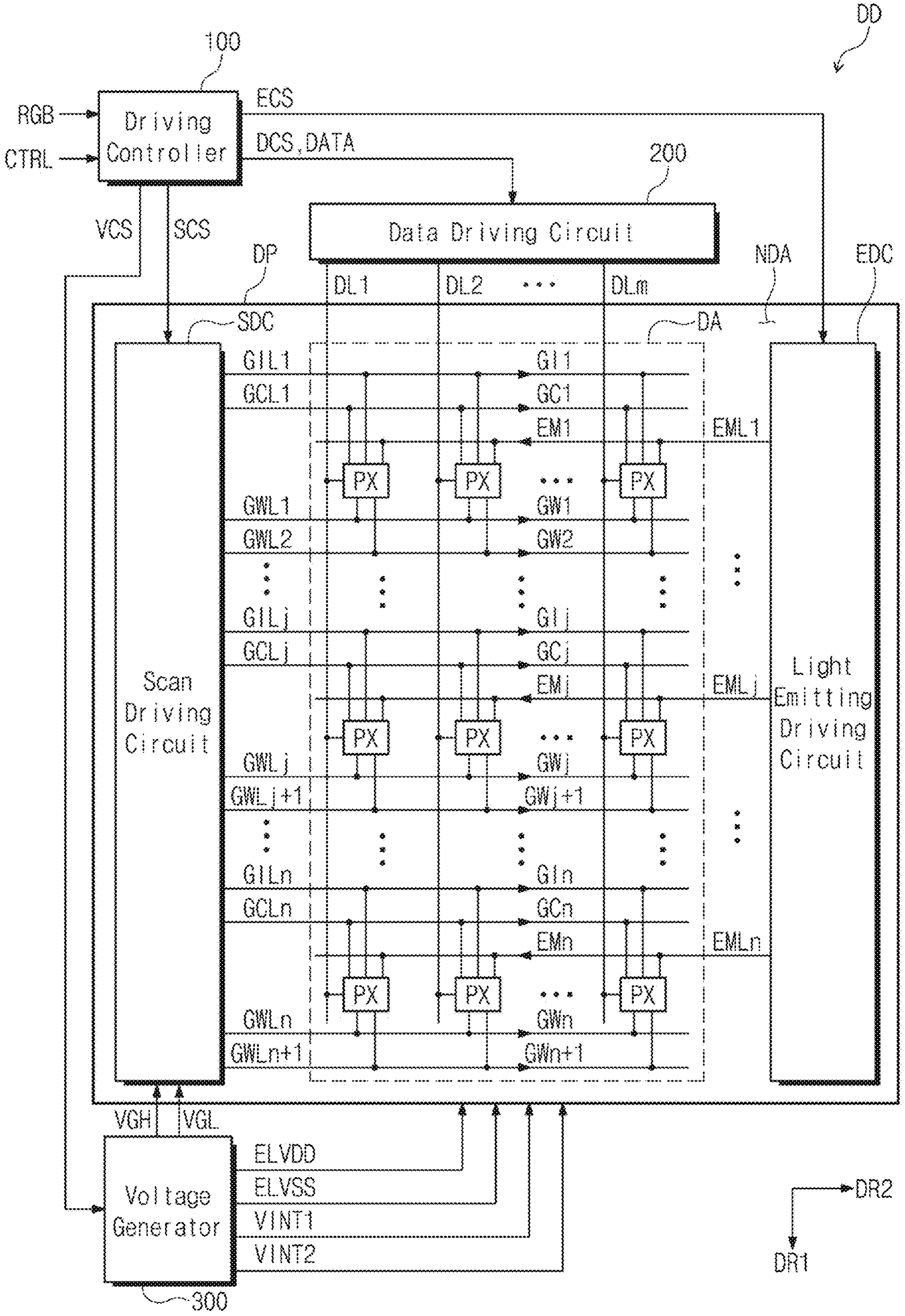
FIG. 4 is a block diagram of a display device according to an embodiment of the disclosure.

FIG. 4 is a block diagram of a display device according to an embodiment of the present disclosure.

Referring to FIG. 4, the display device DD includes a display panel DP, a driving controller 100, a data driving circuit 200, and a voltage generator 300.

The driving controller 100 receives an input image signal RGB and a control signal CTRL. The driving controller 100 outputs an output image signal DATA, a scan control signal SCS, a data control signal DCS, and a light emitting control signal ECS.

The driving controller 100 according to an embodiment of the present disclosure may determine an operating mode to be one of the single-frequency mode and the multi-frequency mode, based on the input image signal RGB. According to an embodiment, the driving controller 100 may determine the operating mode to be one of the single-frequency mode and the multi-frequency mode, based on mode information included in the control signal CTRL.

The data driving circuit 200 receives the data control signal DCS and the output image signal DATA from the driving controller 100. The data driving circuit 200 converts the output image signal DATA into data signals and then outputs the data signals to a plurality of data lines DL1 to DLm to be described later. The data signals are analog voltages corresponding to grayscale values of the output image signal DATA.

The voltage generator 300 generates voltages for the operation of the display panel DP. According to an embodiment, the voltage generator 300 generates a first driving voltage ELVDD, a second driving voltage ELVSS, a first initialization voltage VINT1, a second initialization voltage VINT2, a first voltage VGH, and a second voltage VGL.

The display panel DP includes scan lines GIL1 to GILn, GCL1 to GCLn, and GWL1 to GWLn+1, light emitting control lines EML1 to EMLn, the data lines DL1 to DLm, and pixels PX. The display panel DP may further include a scan driving circuit SDC and a light emitting driving circuit EDC. According to an embodiment, the scan driving circuit SDC may be disposed at a first side of the display panel DP. The scan lines GIL1 to GILn, GCL1 to GCLn, and GWL1 to GWLn+1 extend in the second direction DR2 from the scan driving circuit SDC.

The light emitting driving circuit EDC is disposed at a second side of the display panel DP. The light emitting control lines EML1 to EMLn extend from the light emitting driving circuit EDC, in a direction opposite to the second direction DR2.

The scan lines GIL1 to GILn, GCL1 to GCLn, and GWL1 to GWLn+1 and the light emitting control lines EML1 to EMLn are arranged to be spaced from each other in the first direction DR1. The data lines DL1 to DLm extend in the first direction DR1 from the data driving circuit 200, and may be arranged to be spaced apart from each other in the second direction DR2.

As illustrated in FIG. 4, the scan driving circuit SDC and the light emitting driving circuit EDC are arranged to face each other while interposing the pixels PX interposed between the scan driving circuit SDC and the light emitting driving circuit EDC, but the present disclosure is not limited thereto. For another example, the scan driving circuit SDC and the light emitting driving circuit EDC may be positioned adjacent to each other at any one of the first side and the second side of the display panel DP. According to an embodiment, the scan driving circuit SDC and the light emitting driving circuit EDC may be integrally implemented into one circuit.

According to an embodiment, the scan driving circuit SDC and the light emitting driving circuit EDC may be implemented to be a separate integrated circuit, instead of disposed in the display panel DP.

The plurality of pixels PX are electrically connected to the scan lines GIL1 to GILn, GCL1 to GCLn, and GWL1 to GWLn+1, the light emitting control lines EML1 to EMLn, and the data lines DL1 to DLm. According to an embodiment, each of the plurality of pixels PX may be electrically connected to four scan lines and one light emitting control line. For example, as illustrated in FIG. 4, a first row of pixels may be connected to the scan lines GIL1, GCL1, GWL1, and GWL2 and the light emitting control line EML1. Furthermore, a j-th row of pixels may be connected to the scan lines GILj, GCLj, GWLj, and GWLj+1 and the light emitting control line EMLj. An n-th row of pixels may be connected to the scan lines GILn, GCLn, GWLn, and GWLn+1 and the light emitting control line EMLn.

Each of the plurality of pixels PX includes a light emitting device ED (see FIG. 5) and a pixel circuit PXC (see FIG. 5) to control the light emitting device ED to emit light. The pixel circuit PXC may include at least one transistor and at least one capacitor. The scan driving circuit SDC and the light emitting driving circuit EDC may include transistors formed through the same process as processes for transistors included in the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals GI1 to GIn, GC1 to GCn, and GW1 to GWn+1 to the scan lines GIL1 to GILn, GCL1 to GCLn, and GWL1 to GWLn+1 in response to the scan control signal SCS. According to an embodiment, the scan driving circuit SDC receives the first voltage VGH and the second voltage VGL from the voltage generator 300. The scan driving circuit SDC may output the scan signals GI1 to GIn, and GC1 to GCn, which swing between the first voltage VGH and the second voltage VGL, to the scan lines GIL1 to GILn, and GCL1 to GCLn. The scan driving circuit SDC may output scan signals GW1 to GWn+1, which swing between agate high voltage different from the first voltage VGH and a gate low voltage different from the second voltage VGL, to the scan lines GWL1 to GWLn+1. The gate high voltage different from the first voltage VGH and the gate low voltage different from the second voltage VGL may be provided from the voltage generator 300.

According to an embodiment, the scan driving circuit SDC may output the scan signals GI1 to Gin, GC1 to GCn, and GW1 to GWn+1, which swing between the first voltage VGH and the second voltage VGL, to the scan lines GIL1 to GILn, GCL1 to GCLn, and GWL1 to GWLn+1.

The light emitting driving circuit EDC receives the light emitting control signal ECS from the driving controller 100. The light emitting driving circuit EDC may output the light emitting signals EM1 to EMn to the light emitting control lines EML1 to EMLn, in response to the light emitting control signal ECS.

According to an embodiment, the driving controller 100 may determine an operating mode, based on the input image signal RGB. The driving controller 100 drives the display region DA at the reference frequency (e.g., 120H) when the determined operating mode is the single-frequency mode.

When the determined operating mode is the multi-frequency mode, the driving controller 100 may divide the display panel DP into the first display region DA1 (see FIG. 1) and the second display region DA2 (see FIG. 1), and may set an operating frequency for each of the first display region DA1 and the second display region DA2. For example, the driving controller 100 may drive the first display region DA1 at the first operating frequency (e.g., 120 Hz), and may drive the second display region DA2 at the second operating frequency (e.g., 1 Hz) in the multi-frequency mode.

Figure 5:
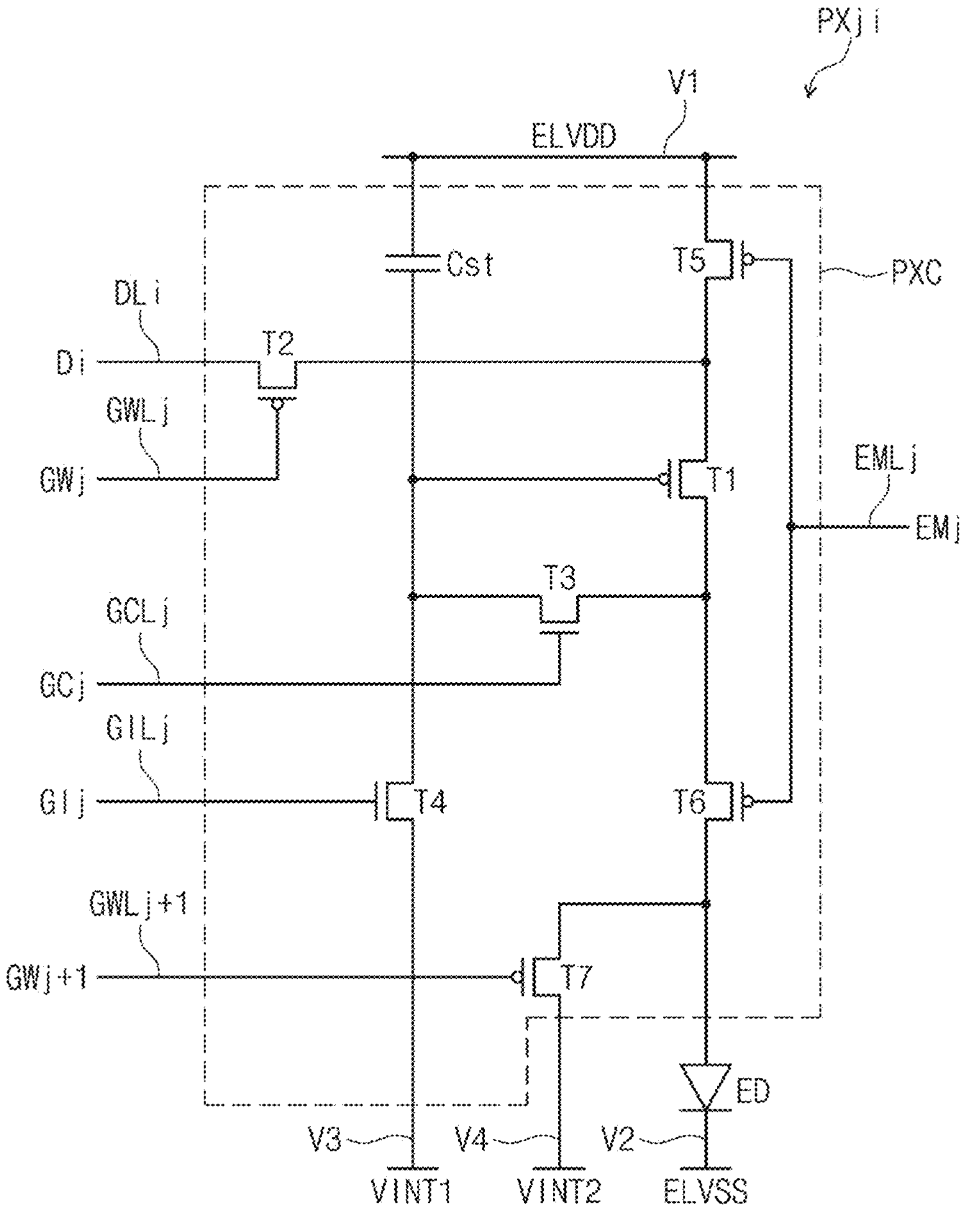
FIG. 5 is an equivalent circuit diagram of a pixel, according to an embodiment of the disclosure.

FIG. 5 is an equivalent circuit diagram of a pixel, according to an embodiment of the present disclosure.

FIG. 5 illustrates a pixel PXji connected to the i-th data line DLi of the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th light emitting control line EMLj of the light emitting control lines EML1 to EMLn, which are illustrated in FIG. 4.

Each of the pixels PX illustrated in FIG. 4 may have the same circuit configuration as the equivalent circuit diagram of the pixel PXji illustrated in FIG. 5. The pixel PXji of the display device according to an embodiment includes the pixel circuit PXC and at least one light emitting device ED. According to an embodiment, the light emitting device ED may be an organic light emitting diode. The pixel circuit PXC includes first to seventh transistors T1, T2, T3, T4, T5, T6, and T7 and a capacitor Cst.

According to an embodiment, the third and fourth transistors T3 and T4 among the first to seventh transistors T1 to T7 are N-type transistors including an oxide semiconductor serving as a semiconductor layer. Each of the first, second, fifth, sixth, and seventh transistors T1, T2, T5, T6, and T7 is a P-type transistor including a low-temperature polycrystalline silicon ("LTPS") semiconductor layer. However, the present disclosure is not limited thereto, all of the first to seventh transistors T1 to T7 may be P-type transistors or N-type transistors in another embodiment. According to an embodiment, at least one of the first to seventh transistors T1 to T7 may be an N-type transistor, and the remaining transistors may be P-type transistors. In addition, the circuit configuration of a pixel according to an embodiment of the present disclosure is not limited to that illustrated in FIG. 5. The pixel circuit PXC illustrated in FIG. 5 is provided only for the illustrative purpose. For example, the configuration of the pixel circuit PXC may be modified and implemented.

The j-th scan lines GILj, GCLj, and GWLj may transmit j-th scan signals GIj, GCj, and GWj, respectively, and the (j+1)-th scan line GWLj+1 may transmit the (j+1)-th scan signals GWj+1. The light emitting control line EMLj transmits the light emitting signal EMj, and the i-th data line DLi transmits the i-th data signal Di. In the following description, the i-th data signal Di is referred to as a data signal Di. The data signal Di may have a voltage level corresponding to the input image signal RGB which is input to the display device DD (see FIG. 4). The first to fourth driving voltage lines V1, V2, V3, and V4 may transmit the first driving voltage ELVDD, the second driving voltage ELVSS, the first initialization voltage VINT1, and the second initialization voltage VINT2, respectively.

The first transistor T1 includes a first electrode connected to the first driving voltage line V1 through the fifth transistor T5, a second electrode electrically connected to an anode of the light emitting device ED through the sixth transistor T6, and a gate electrode connected to a first terminal of the capacitor Cst. The first transistor T1 may receive the data signal Di transmitted through the data line DLi depending to the switching operation of the second transistor T2 and supply a driving current Id to the light emitting device ED.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj transmitted through the scan line GWLj and may transmit the data signal Di transmitted through the data line DLi to the first electrode of the first transistor T1.

The third transistor T3 includes a first electrode connected to the gate electrode of the first transistor T1, a second electrode connected to the second electrode of the first transistor T1, and a gate electrode connected with the scan line GCLj. The third transistor T3 may be turned on in response to the scan signal GCj transmitted through the scan line GCLj, and connect the gate electrode of the first transistor T1 to the second electrode of the first transistor T1 such that the first transistor T1 is diode-connected.

The fourth transistor T4 includes a first electrode connected to the gate electrode of the first transistor T1, a second electrode connected to the third driving voltage line V3, which is to transmit the first initialization voltage VINT1, and a gate electrode connected to the scan line GILj. The fourth transistor T4 may be turned on in response to the scan signal GIj received through the scan line GILj to perform an initialization operation for transmitting the first initialization voltage VINT1 to the gate electrode of the first transistor T1 to perform an initialization operation for initializing the voltage of the gate electrode of the first transistor T1.

The fifth transistor T5 includes a first electrode connected to the first driving voltage line V1, a second electrode connected to the first electrode of the first transistor T1, and a gate electrode connected to the light emitting control line EMLj.

The sixth transistor T6 includes a first electrode connected to the second electrode of the first transistor T1, a second electrode connected to the anode of the light emitting device ED, and a gate electrode connected to the light emitting control line EMLj.

The fifth transistor T5 and the sixth transistor T6 may be simultaneously turned on in response to the light emitting signal EMj received through the light emitting control line EMLj. Accordingly, the first driving voltage ELVDD may be compensated through the first transistor tI which is diode-connected transistor T1 and transmitted to the light emitting device ED.

The seventh transistor T7 includes a first electrode connected with the second electrode of the sixth transistor T6, a second electrode connected to the fourth driving voltage line V4, and a gate electrode connected to the scan line GWLj+1. The seventh transistor T7 is turned on in response to the scan signal GWj+1 received through the scan line GWLj+1 and bypasses a current of the anode of the light emitting device ED to the fourth driving voltage line V4.

One terminal of the capacitor Cst is connected to the gate electrode of the first transistor T1, and another terminal of the capacitor Cst is connected to the first driving voltage line V1. A cathode of the light emitting device ED may be connected to the second driving voltage line V2 which transmits the second driving voltage ELVSS. According to an embodiment, the structure of the pixel PXji according to an embodiment is not limited to the structure illustrated in FIG. 5. For another example, the number of transistors included in one pixel PXji, the number of capacitors included in the pixel PXji, and the connection relationship between the transistors and the capacitors may be variously modified. In addition, the scan lines GWLj, GCLj, GILj, and GWLj+1 connected to the second, third, fourth, and seventh transistors T2, T3, T4, and T7 are provided only for the illustrative purpose, and may receive other scan signals. For example, the seventh transistor T7 may be connected to the scan line GCLj instead of the scan line GWLj+1.

Figure 6:
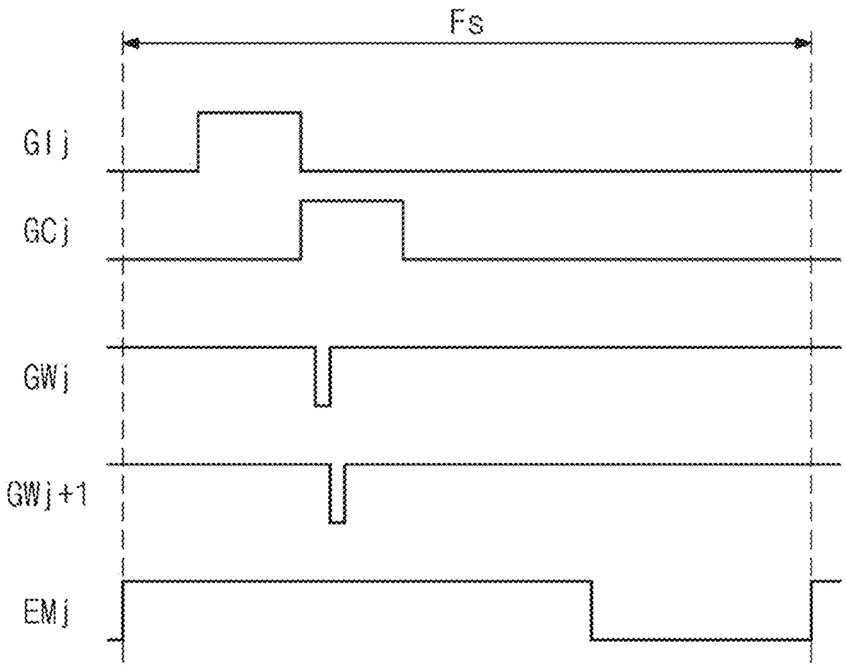
FIG. 6 is a timing diagram for describing an operation of a pixel illustrated in FIG. 5.

FIG. 6 is a timing diagram for describing an operation of a pixel illustrated in FIG. 5. Hereinafter, an operation of a display device according to an embodiment will be described with reference to FIGS. 5 and 6.

Referring to FIGS. 5 and 6, the scan signal GIj having a high level is provided through the scan line GILj during an initialization period within one frame Fs. The fourth transistor T4 is turned on in response to the scan signal GIj having a high level, the first initialization voltage VINT1 is transmitted to the gate electrode of the first transistor T1 through the fourth transistor T4 to initialize the first transistor T1.

Next, when the scan signal GCj having the high level is provided through the scan line GCLj during the data programming and compensation period, the third transistor T3 is turned on. The first transistor T1 is diode-connected by the third transistor T3 thus turned-on and biased forward.

Furthermore, the second transistor T2 is turned on by the scan signal GWj having a low level. In the case, a compensation voltage, which is obtained by reducing the voltage of the data signal Di, which is provided through the data line DLi, by a threshold voltage of the first transistor T1, is applied to the gate electrode of the first transistor T1. In other words, a gate voltage applied to the gate electrode of the first transistor T1 may be a compensation voltage.

As the first driving voltage ELVDD and the compensation voltage are applied to opposite terminals of the capacitor Cst, respectively, charges corresponding to a difference in voltage between the opposite terminals may be stored in the capacitor Cst.

Meanwhile, the seventh transistor T7 is turned on by receiving the scan signal GWj+1 having the low level through the scan line GWLj+1. As the seventh transistor T7 is turned on, the anode of the light emitting device ED may be initialized to the second initialization voltage VINT2.

Next, during a light emitting period, the light emitting signal EMj provided from the light emitting control line EMLj is changed from a high level to a low level. During the light emitting period, the fifth transistor T5 and the sixth transistor T6 are turned on by the light emitting signal EMj having the low level. As the fifth transistor T5 is turned on, a driving current is generated due to the voltage difference between the gate voltage of the gate electrode of the first transistor T1 and the first driving voltage ELVDD, and the driving current is supplied to the light emitting device ED through the sixth transistor T6, such that the light emitting device ED emits light.

Figure 7:
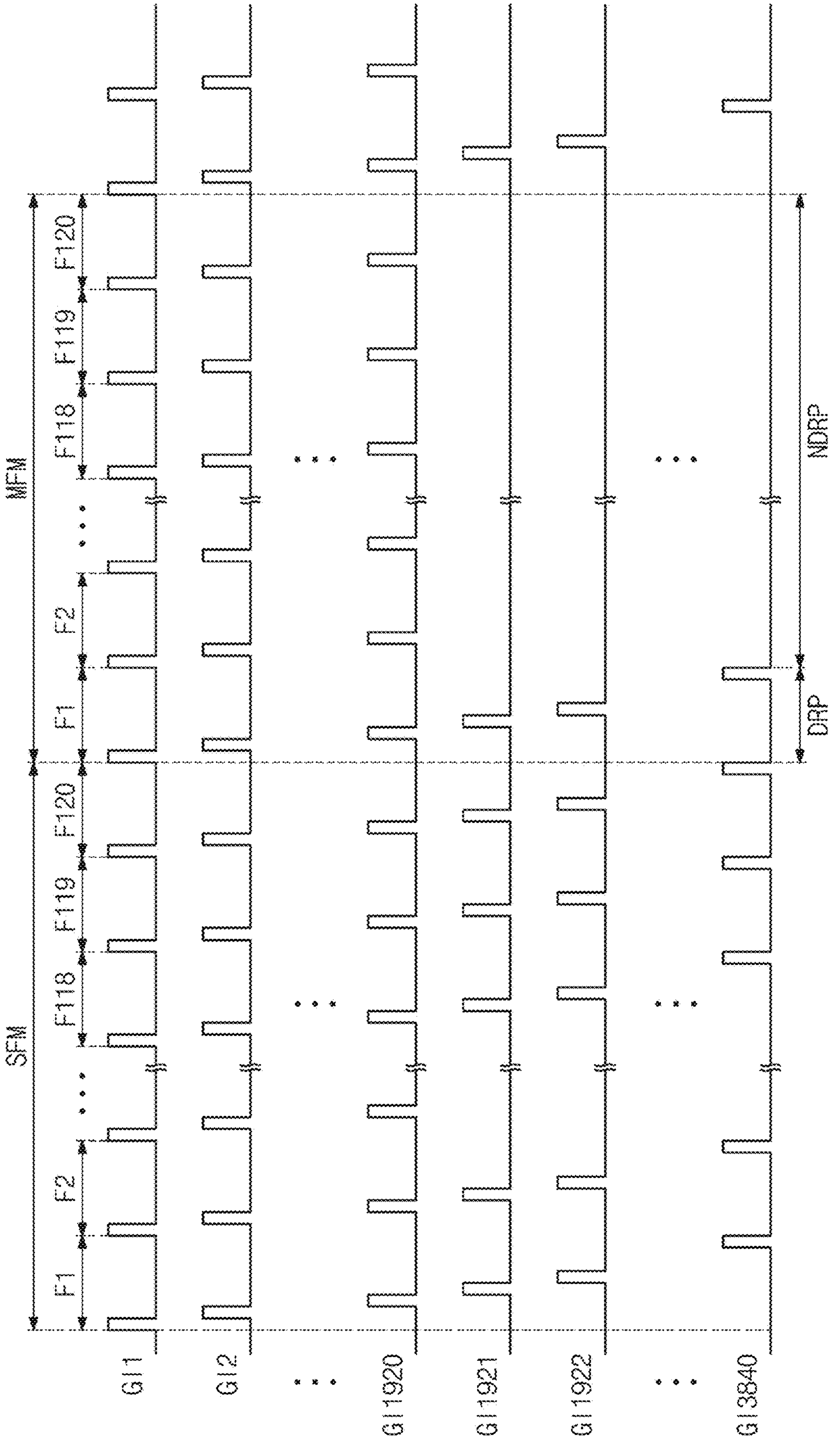
FIGS. 7, 8, and 9 illustrate scan signals in a single-frequency mode and a multi-frequency mode.

FIG. 7 illustrates scan signals GI1 to GI3840 in the single-frequency mode SFM and the multi-frequency mode MFM.

Figure 8:
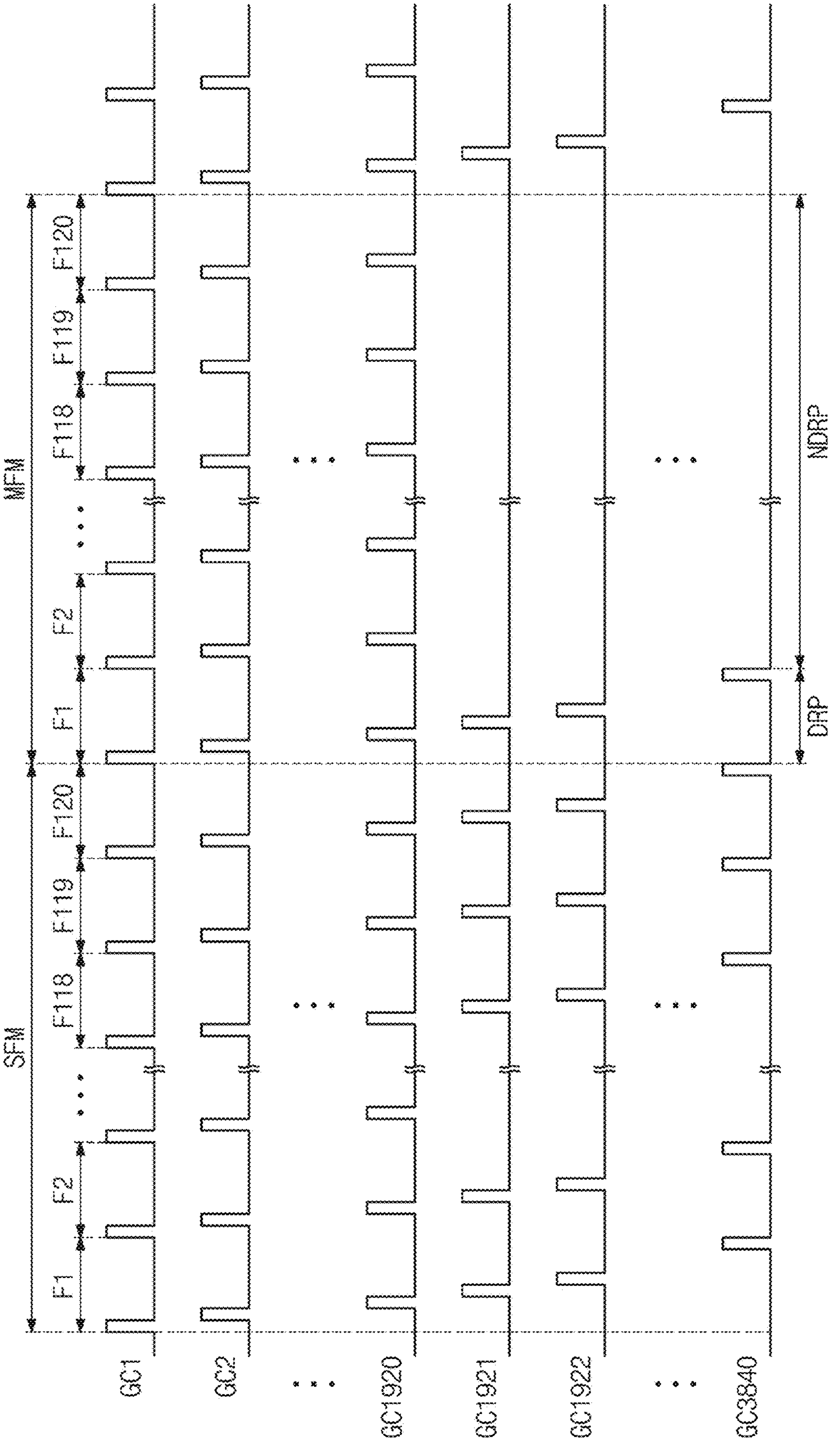

FIG. 8 illustrates scan signals GI1 to GI3840 in the single-frequency mode SFM and the multi-frequency mode MFM.

Although each of FIGS. 7 and 8 illustrate 3840 scan signals GI1 to GI3840 and GC1 to GC3840, respectively, the present disclosure is not limited thereto. The number of the scan signals GI1 to GI3840 and GC1 to GC3840 may be varied depending on the size and the resolution of the display panel DP.

Referring to FIGS. 4, 7, and 8, according to an embodiment, the scan signals GI1 to GI1920 among the scan signals GI1 to GI3840 may correspond to the first display region DA1 of the display device DD illustrated in FIG. 1 and remaining scan signals GI1921 to GI3840 may corresponding to the second display region DA2, during the multi-frequency mode MFM.

According to an embodiment, the frequencies of the scan signals GI1 to GI3840 and GC1 to GC3840 are 120 Hz in the single-frequency mode SFM.

During the single-frequency mode SFM, the scan signals GI1 to GI3840 and GC1 to GC3840 may be activated to be in a high level at each of the first frame F1 to the 120-th frame F120.

During the multi-frequency mode MFM, the scan signals GI1 to GI1920 and GC1 to GC1920 may be activated to be in a high level, at each of the first frame FI to the 120-th frame F120, and the scan signals GI1921 to GI3840 and GC1921 to GC3840 may be activated to be in a high level only at the first frame F1. In other words, the multi-frequency mode MFM, the frequencies of the scan signals GI1 to GI1920 are 120 Hz, and the frequencies of the scan signals GI1921 to GI3840 are 1 Hz.

In other words, the first frame F1 may correspond to a driving duration DRP in which the second display region DA2 is driven, and the second frame F2 to the 120-th frame F120 may correspond to a non-driving duration NDRP in which the second display region DA2 is not driven.

Therefore, the frequencies of the scan signals GI1 to GI1920 and GC1 to GC1920 corresponding to the first display region DA1 for displaying the moving picture may be first driving frequencies (e.g., 120 Hz), and the frequencies of the scan signals GI1921 to GI3840, and GC1921 to GC3840 corresponding to the second display region DA2 for displaying the still image may be a second operating frequency (e.g., 1 Hz). As the first display region DA1 for displaying the moving picture is driven at a first operating frequency, the display quality of the moving picture may be maintained. Since the second display region DA2 for displaying a still image is driven at a second operating frequency lower than the first operating frequency, power consumption may be reduced.

Figure 9:
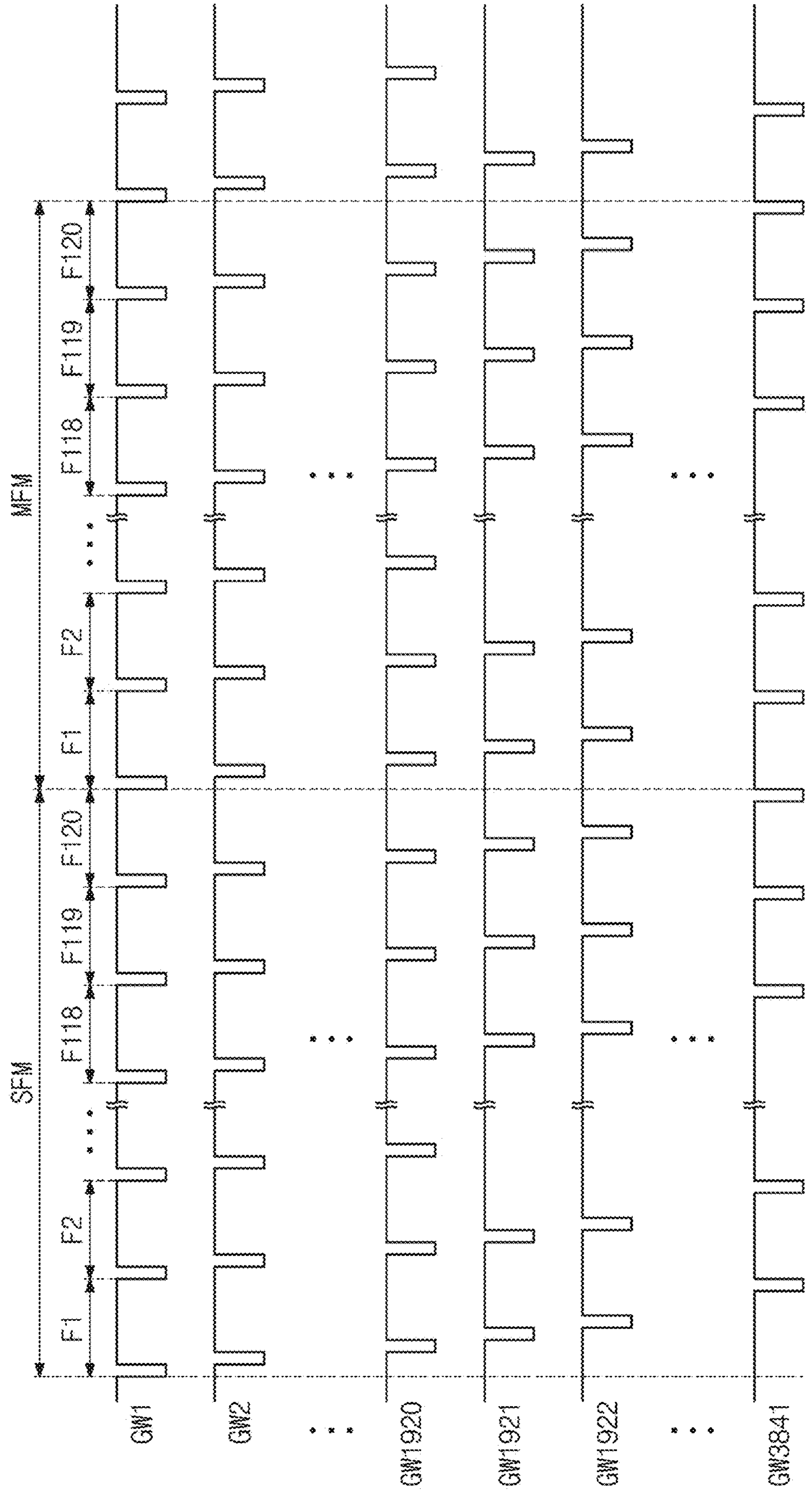

FIG. 9 illustrates scan signals GW1 to GW3841 in the single-frequency mode SFM and the multi-frequency mode MFM.

FIG. 9 illustrates scan signals GW1 to GW3841 by way of example. According to an embodiment, the frequencies of the scan signals GW1 to GW3841 are 120 Hz in the single-frequency mode SFM. According to an embodiment, the frequencies of the scan signals GW1 to GW3841 are 120 Hz in the multi-frequency mode MFM. In other words, during the multi-frequency mode MFM, the frequencies of the scan signals GW1 to GW3841 are identical to those of the single-frequency mode SFM.

Referring to FIGS. 1, 4, and 9, the driving controller 100 provides the output image signal DATA corresponding to the input image signal RGB to the data driving circuit 200 during the single-frequency mode SFM. Therefore, the data signals provided to the data lines DL1 to DLm have voltage levels corresponding to the output image signal DATA.

The driving controller 100 provides the output image signal DATA corresponding to the input image signal RGB to the data driving circuit 200, during the first frame F1 of the multi-frequency mode MFM.

The driving controller 100 provides the output image signal DATA corresponding to the input image signal RGB to the data driving circuit 200, when the first display region DA1 is driven at each of the second frame F2 to the 120-th frame F120, in the multi-frequency mode MFM.

The driving controller 100 may not output the output image signal DATA, when the second display region DA2 is driven at each of the second frame F2 to the 120-th frame F120, in the multi-frequency mode MFM.

According to an embodiment, the frequencies of the light emitting signals EM1 to EMn illustrated in FIG. 4 may be 120 Hz during the multi-frequency mode MFM as well as the single-frequency mode SFM, which is identical to the scan signals GW1 to GW3841.

Figure 10:
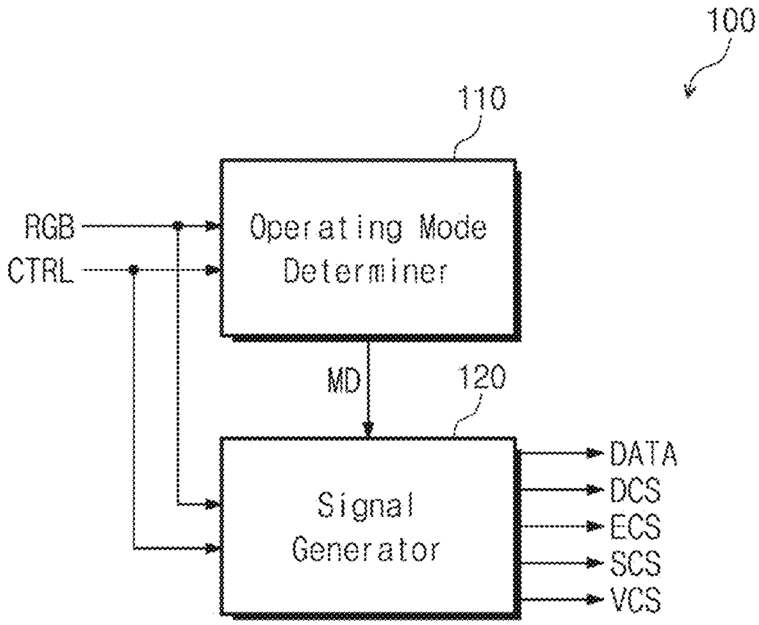
FIG. 10 is a block diagram of a driving controller, according to an embodiment of the disclosure.

FIG. 10 is a block diagram illustrating the configuration of a driving controller, according to an embodiment of the present disclosure.

Referring to FIGS. 4 and 10, the driving controller 100 includes an operating mode determiner 110 and a signal generator 120. The operating mode determiner 110 determines a frequency mode based on the input image signal RGB and the control signal CTRL and outputs a mode signal MD corresponding to the determined frequency mode. According to an embodiment, the operating mode determiner 110 may determine the operating mode, based on mode information included in the control signal CTRL provided from the outside (e.g., a main processor and a graphic processor). For example, the operating mode determiner 110 may output the mode signal MD for indicating the multi-frequency mode, when a specific application program is executed. The mode signal MD may include not only information regarding whether the operating mode is the single-frequency mode or the multi-frequency mode, but also information on the first operating frequency for the first display region DA1 and the second operating frequency for the second display region DA2. In addition, the mode signal MD may include a starting position of the second display region DA2 and/or information on a boundary region of the second display region DA2.

The signal generator 120 outputs the output image signal DATA, the data control signal DCS, the light emitting control signal ECS, the scan control signal SCS, and the voltage control signal VCS in response to the input image signal RGB, the control signal CTRL, and the mode signal MD.

When the mode signal MD indicates the single-frequency mode, the signal generator 120 may output the output image signal DATA, the data control signal DCS, the light emitting control signal ECS, the scan control signal SCS, and the voltage control signal VCS for driving the first display region DA1 and the second display region DA2 at a first operating frequency, respectively.

When the mode signal MD indicates the multi-frequency mode, the signal generator 120 may output the output image signal DATA, the data control signal DCS, the light emitting control signal ECS, the scan control signal SCS, and the voltage control signal VCS such that the first display region DA1 is driven at the first operating frequency, and the second display region DA2 is driven at the second operating frequency.

The data driving circuit 200, the scan driving circuit SDC, and the light emitting driving circuit EDC illustrated in FIG. 4 operate to display an image on the display panel DP, in response to the output image signal DATA, the data control signal DCS, the light emitting control signal ECS, and the scan control signal SCS, respectively.

The voltage generator 300 illustrated in FIG. 4 may output the first voltage VGH and the second voltage VGL having a voltage level corresponding to the voltage control signal VCS.

Figure 11:
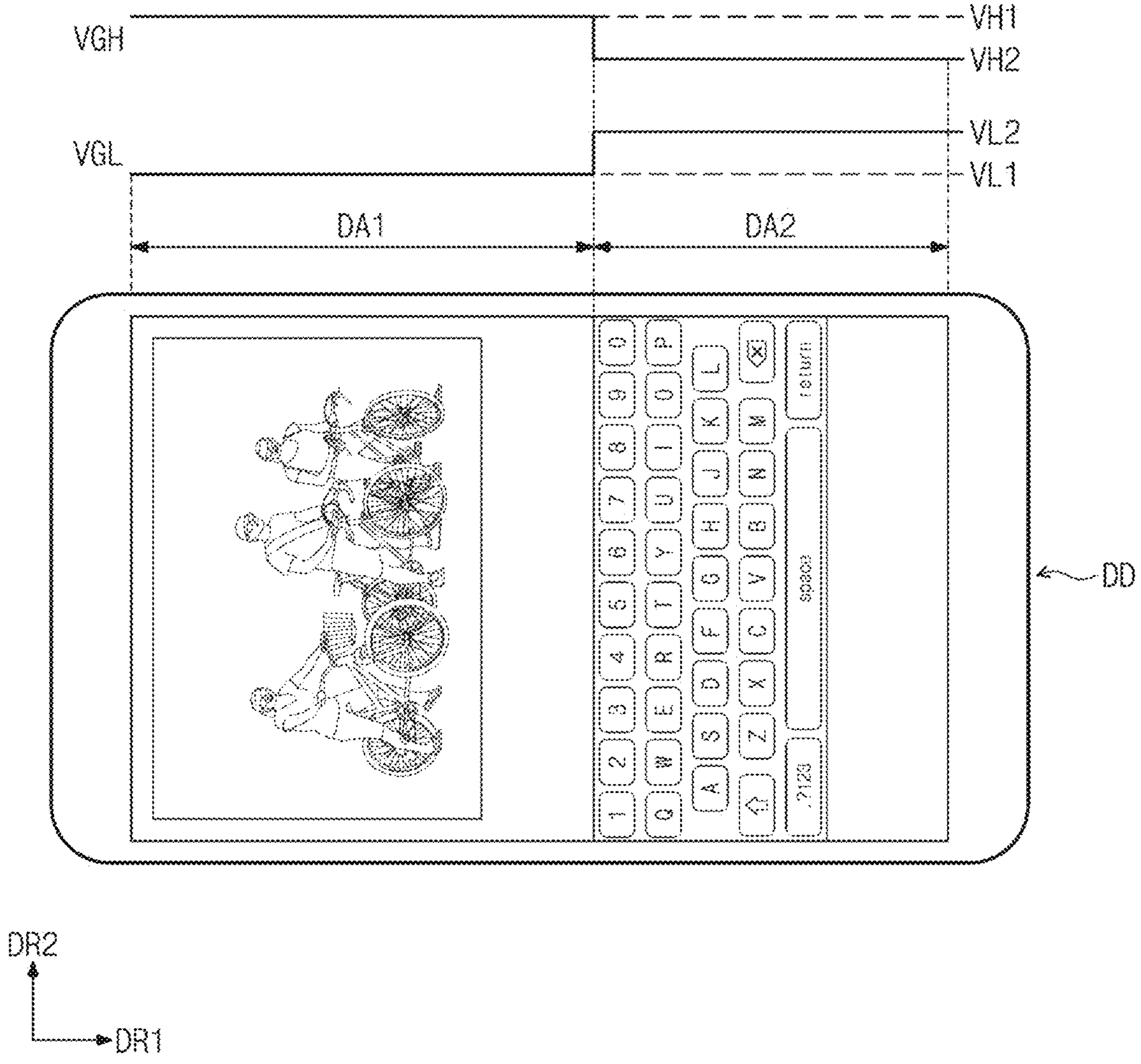
FIG. 11 is a view illustrating voltage level change between a first voltage and a second voltage in a multi-frequency mode according to an embodiment.

FIG. 11 is a view illustrating voltage level change of the first voltage VGH and the second voltage VGL in a multi-frequency mode.

Referring to FIGS. 4, 7, 8, and 11, voltage levels of the first voltage VGH and the second voltage VGL provided from the voltage generator 300 to the scan driving circuit SDC may be changed at the second frame F2 in the multi-frequency mode MFM. For example, when the first display region DA1 is driven, the first voltage VGH may be in a first high voltage level VH1, and the second voltage VGL may be in a first low voltage level VL1. When the second display region DA2 is driven, the first voltage VGH may be in a second high voltage level VH2, and the second voltage VGL may be in a second low voltage level VL2.

According to an embodiment, the first high voltage level VH1, the second high voltage level VH2, the first low voltage level VL1, and the second low voltage level VL2 may have a relationship of VH1>VH2>VL2>VL1.

According to another embodiment, the second high voltage level VH2 may be equal to the first low voltage level VL1. According to still another embodiment, the second high voltage level VH2 may be equal to the second low voltage level VL2.

Figure 12:
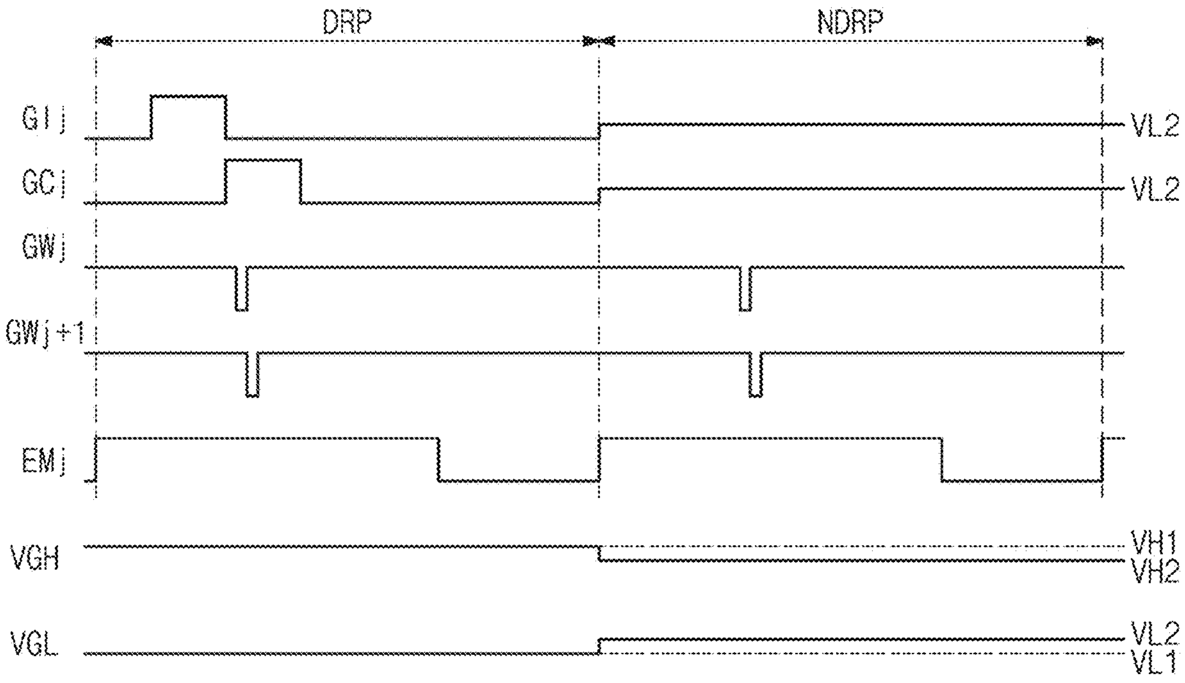
FIG. 12 is a view illustrating voltage level change of a first voltage and a second voltage during a driving duration and a non-driving duration in a multi-frequency mode.

FIG. 12 is a view illustrating the voltage level change of the driving duration DRP and the non-driving duration NDRP in the multi-frequency mode according to the embodiment of FIG. 11.

Referring to FIGS. 11 and 12, the multi-frequency mode includes the driving duration DRP in which the second display region DA2 is driven and the non-driving duration NDRP in which the second display region DA2 is not driven.

As in illustrated in FIG. 12, the scan signals GIj, GCj, GWj, and GWj+1 and the light emitting signals EMj may be signals provided to the scan lines GILj, GCLj, GWLj, GWLj+1 (see FIG. 4) and the light emitting line EMLj (see FIG. 4) corresponding to the second display region DA2.

As described in FIGS. 7, 8, and 9, the driving duration DRP in the multi-frequency mode MFM may include the first frame F1. In addition, the non-driving duration NDRP in the multi-frequency mode MFM may include the second frame F2 to the 120-th frame F120.

The scan signals GIj and GCj may be switched to be in an active level (e.g., a high level) during the driving duration DRP. The scan signals GIj and GCj may be switched to be in an inactive level (e.g., a lower level) during the non-driving duration NDRP.

The scan signals GWj and GWj+1 and the light emitting signal EMj may be switched to be in the active level (e.g., a low level) during both the driving duration DRP and the non-driving duration NDRP, respectively.

The first voltage VGH provided from the voltage generator 300 to the scan driving circuit SDC may have mutually different voltage levels from each other during the driving duration DRP and the non-driving duration NDRP in the multi-frequency mode MFM. In addition, the second voltage VGL provided from the voltage generator 300 to the scan driving circuit SDC may have mutually different voltage levels from each other during the driving duration DRP and the non-driving duration NDRP in the multi-frequency mode MFM.

For example, the first voltage VGH may have the first high voltage level VH1, and the second voltage VGL may have a first low voltage level VL1 during the driving duration DRP. The scan driving circuit SDC illustrated in FIG. 4 may output scan signals GIj and GCj that swing between the first voltage VGH in the first high voltage level VH1 and the second voltage VGL in the first low voltage level VL1 during the driving duration DRP.

For example, the first voltage VGH may have the second high voltage level VH2, and the second voltage VGL may have the second low voltage level VL2 during the non-driving duration NDRP. The scan driving circuit SDC illustrated in FIG. 4 may output scan signals GIj and GCj that swing between the first voltage VGH in the second high voltage level VH2 and the second voltage VGL in the second low voltage level VL2 during the non-driving duration NDRP. Since the scan signals GIj and GCj are maintained at an inactive level (i.e., a low level) during the non-driving duration NDRP, the voltage levels of the scan signals GIj and GCj may be the second voltage VGL in the second low voltage level VL2. Even if a voltage level of each of the scan signals GIj and GCj changes from the first low voltage level VL1 to the second low voltage level VL2 during the non-driving duration NDRP, an operation of the pixels PX is not affected.

The scan driving circuit SDC includes a plurality of transistors and receives the first voltage VGH and the second voltage VGL serving as power supply voltages. As the voltage level of the first voltage VGH is decreased during the non-driving duration NDRP and the voltage level of the second voltage VGL is increased, the internal voltage swing range of the scan driving circuit SDC is decreased. Accordingly, power consumption may be minimized in the scan driving circuit SDC.

Figure 13A:
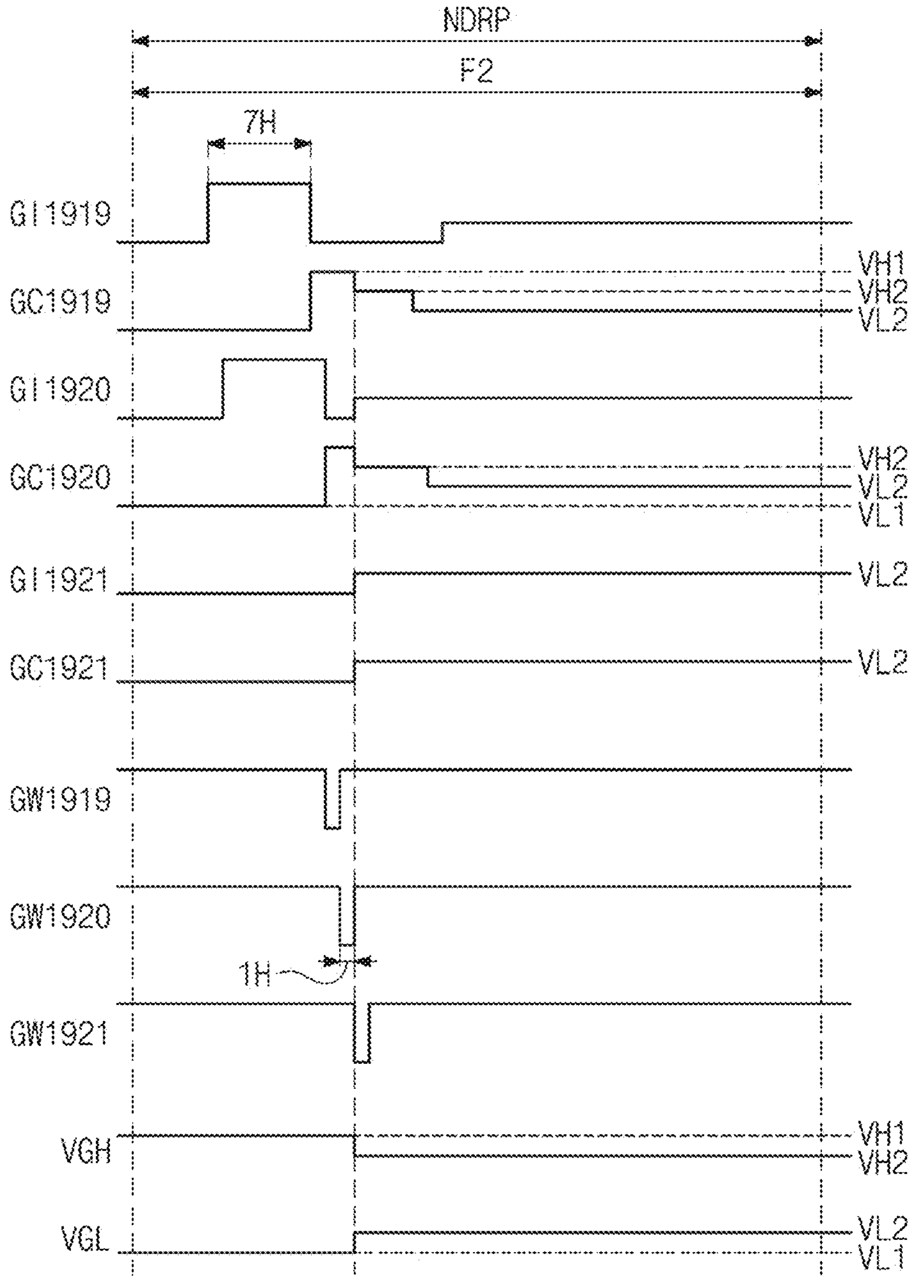
FIGS. 13A and 13B are views illustrating voltage level change of scan signals at a second frame which corresponds to a non-driving duration.
Figure 13B:
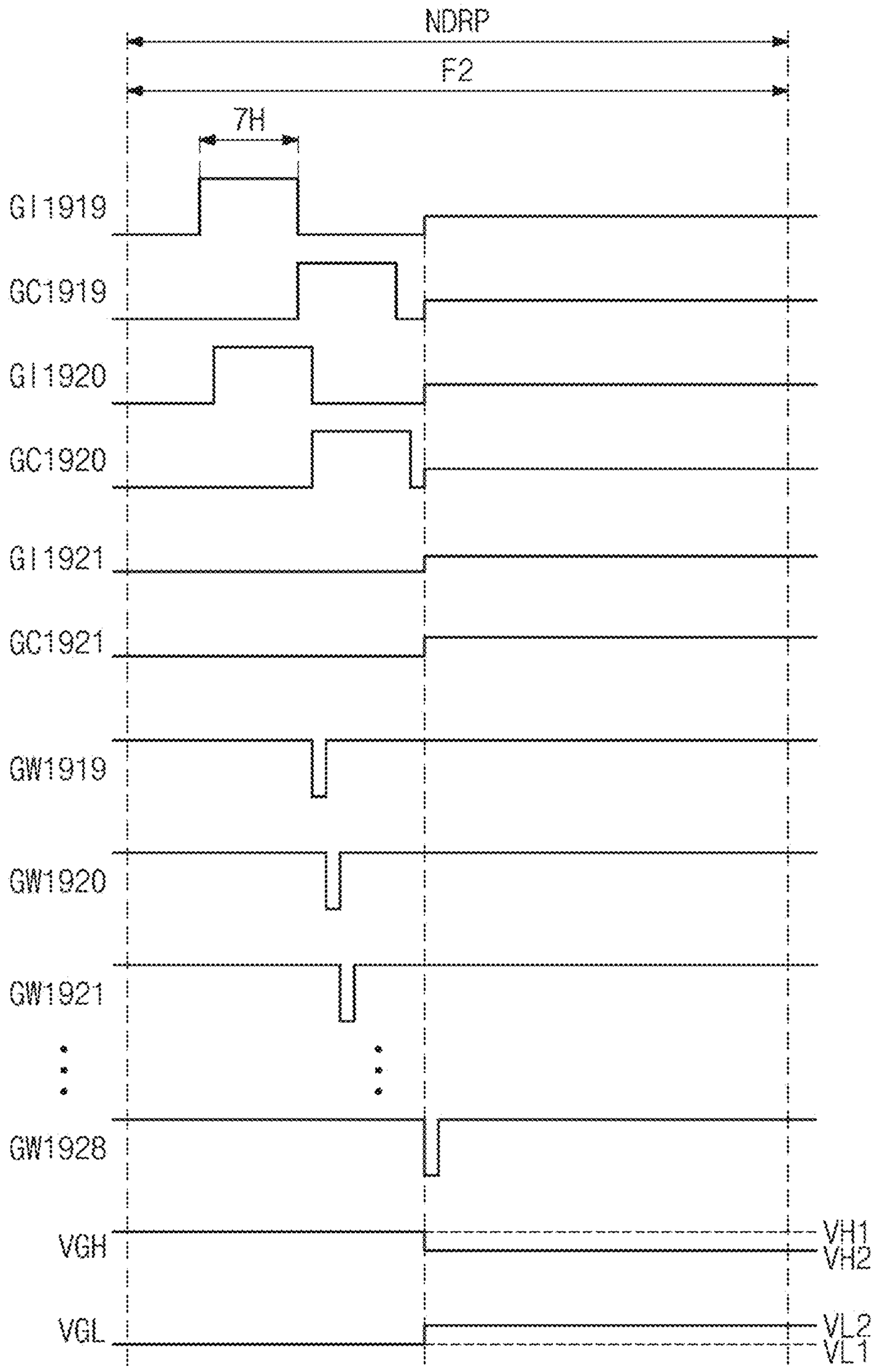

FIGS. 13A and 13B illustrate the voltage level change of scan signals at the second frame F2 during the non-driving duration NDRP.

Referring to FIGS. 4 and 13A, when the operation mode is the multi-frequency mode and when a present frame is the second frame F2 corresponding to the non-driving duration NDRP, the driving controller 100 may output the voltage control signal VCS such that the voltage levels of the first voltage VGH and the second voltage VGL are changed at the start point of the second display region DA2.

According to embodiments illustrated in FIGS. 7, 8, and 9, the scan signals GI1 to GI1920, GC1 to GC1920, and GW1 to GI1920 correspond to the first display region DA1, and the scan signals GI1921 to GI3840, GC1921 to GC3840, and GW1921 to GW3840 correspond to the second display region DA2.

While the scan signals GW1 to GW1920 corresponding to the first display region DA1 are driven, the driving controller 100 may output the voltage control signal VCS such that the first voltage VGH in the first high voltage level VH1 is output and the second voltage VGL in the first low voltage level VL1 is output.

At a starting time point of the second display region DA2, that is, when the scan signal GW1921 is switched to be in the active level (e.g., the low level), the driving controller 100 may output the voltage control signal VCS, such that the first voltage VGH in the second high voltage level VH2 is output and the second voltage VGL in the second low voltage level VL2 is output.

Therefore, when the scan signal GW1921 is switched to be in the active level (e.g., the low level), the first voltage VGH may be changed to be in the second high voltage level VH2, and the second voltage VGL may be changed to be in the second low voltage level VL2.

When a pulse width, in which each of the scan signals GW1 to GW3840 is maintained in the active level, corresponds to one horizontal period (1H), a pulse width in which each of the scan signals GI1 to GI3840 and GC1-GC3840 is maintained in the active level may be a period (e.g., seven horizontal periods; 7H) greater than the one horizontal period (1H). When the scan signal GW1921 is switched to be in the active level (e.g., the low level), and when the first voltage VGH is changed to be in the second high voltage level VH2 and the second voltage VGL is changed to be in the second low voltage level VL2, the voltage level of the scan signal GC1919 or GC1920 may be changed to be in the second high voltage level VH2 from the first high voltage level VH1, during the duration in which the scan signals GC1919 and GC1920 should be maintained in the active level. In this case, the third transistor T3 and the fourth transistor T4 in the pixel PXji illustrated in FIG. 5 may not be sufficiently turned on.

Referring to FIG. 13B, at a starting time point of the second display region DA2, that is, when the scan signal GW1928 is switched to be in the active level (e.g., the low level), the driving controller 100 may output the voltage control signal VCS, such that the first voltage VGH in the second high voltage level VH2 is output and the second voltage VGL in the second low voltage level VL2 is output.

In this case, the voltage level of the scan signals GC1919 and GC1920 may be maintained in the first high voltage level VH1, during the duration in which the scan signals GC1919 and GC1920 are maintained in the active level. Accordingly, the stable operation of the pixel PXji is possible.

Figure 14A:
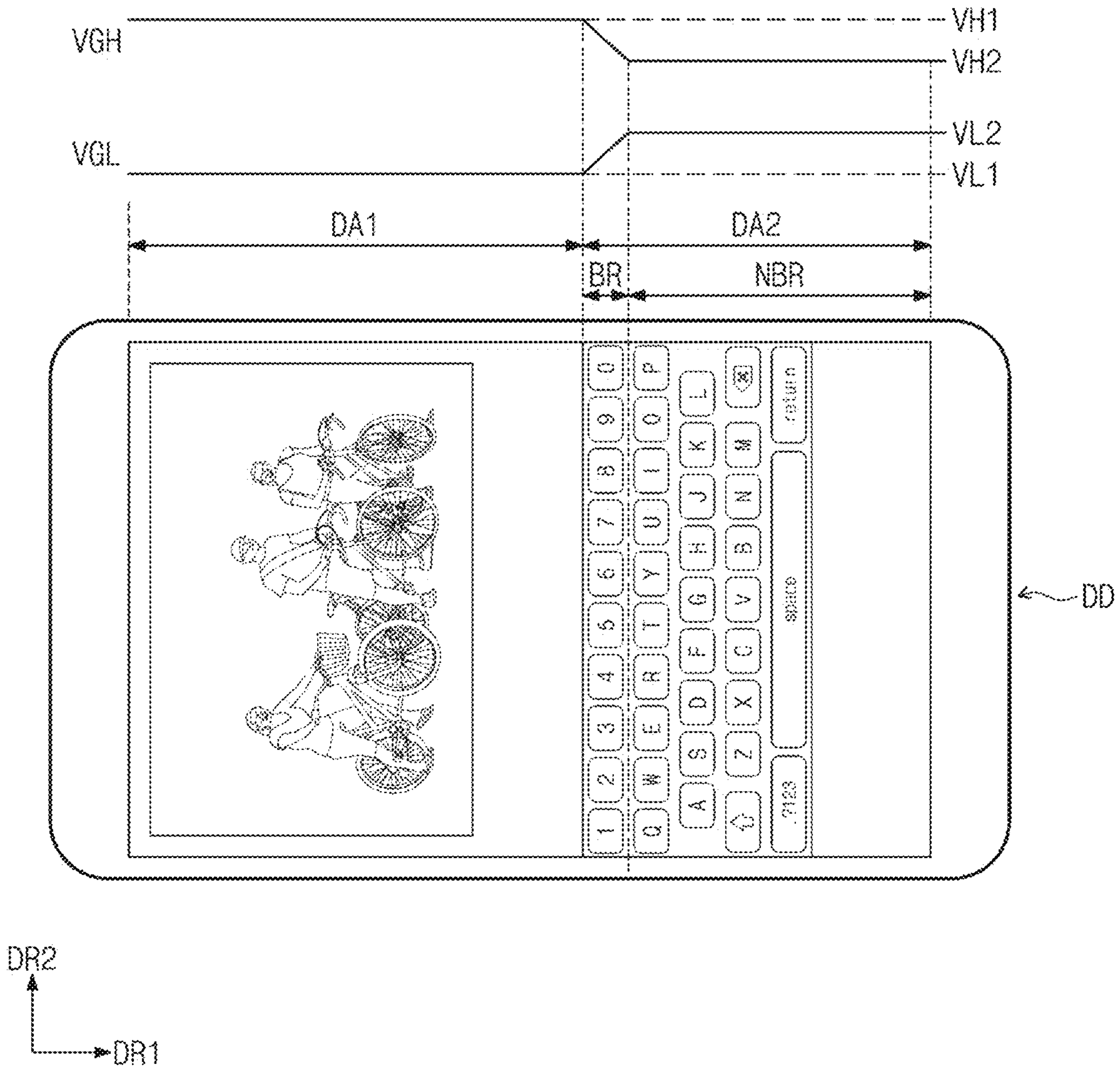
FIG. 14A is a view illustrating voltage level change of a first voltage and a second voltage in a multi-frequency mode according to another embodiment.

FIG. 14A is a view illustrating the voltage level change of the first voltage VGH and the second voltage VGL in a multi-frequency mode according to another embodiment.

Referring to FIGS. 4, 7, 8, and 14A, the second display region DA2 includes a boundary region BR and a non-boundary region NBR. The boundary region BR is a region, which is adjacent to the first display region DA1, of the second display region DA2.

Voltage levels of the first voltage VGH and the second voltage VGL provided from the voltage generator 300 to the scan driving circuit SDC may be changed at the second frame F2 in the multi-frequency mode MFM. When the first display region DA1 is driven, the first voltage VGH may be in the first high voltage level VH1, and the second voltage VGL may be in the first low voltage level VL1. When the non-boundary region NBR of the second display region DA2 is driven, the first voltage VGH may be in the second high voltage level VH2, and the second voltage VGL may be in the second low voltage level VL2. When the boundary region BR of the second display region DA2 is driven, the voltage level of the first voltage VGH may be gradually (or stepwise) decreased to the second high voltage level VH2 from the first high voltage level VH1. Here, the second high voltage level VH2 may be lower than the first high voltage level VH1. When the boundary region BR of the second display region DA2 is driven, the voltage level of the second voltage VGL may be gradually (or stepwise) increased to the second low voltage level VL2 from the first low voltage level VL1. Here, the second low voltage level VL2 may be higher than the first low voltage level VL1. Therefore, the display quality may be effectively prevented from being deteriorated due to a sudden voltage level change of the first voltage VGH and the second voltage VGL in the boundary region BR.

Figure 14B:
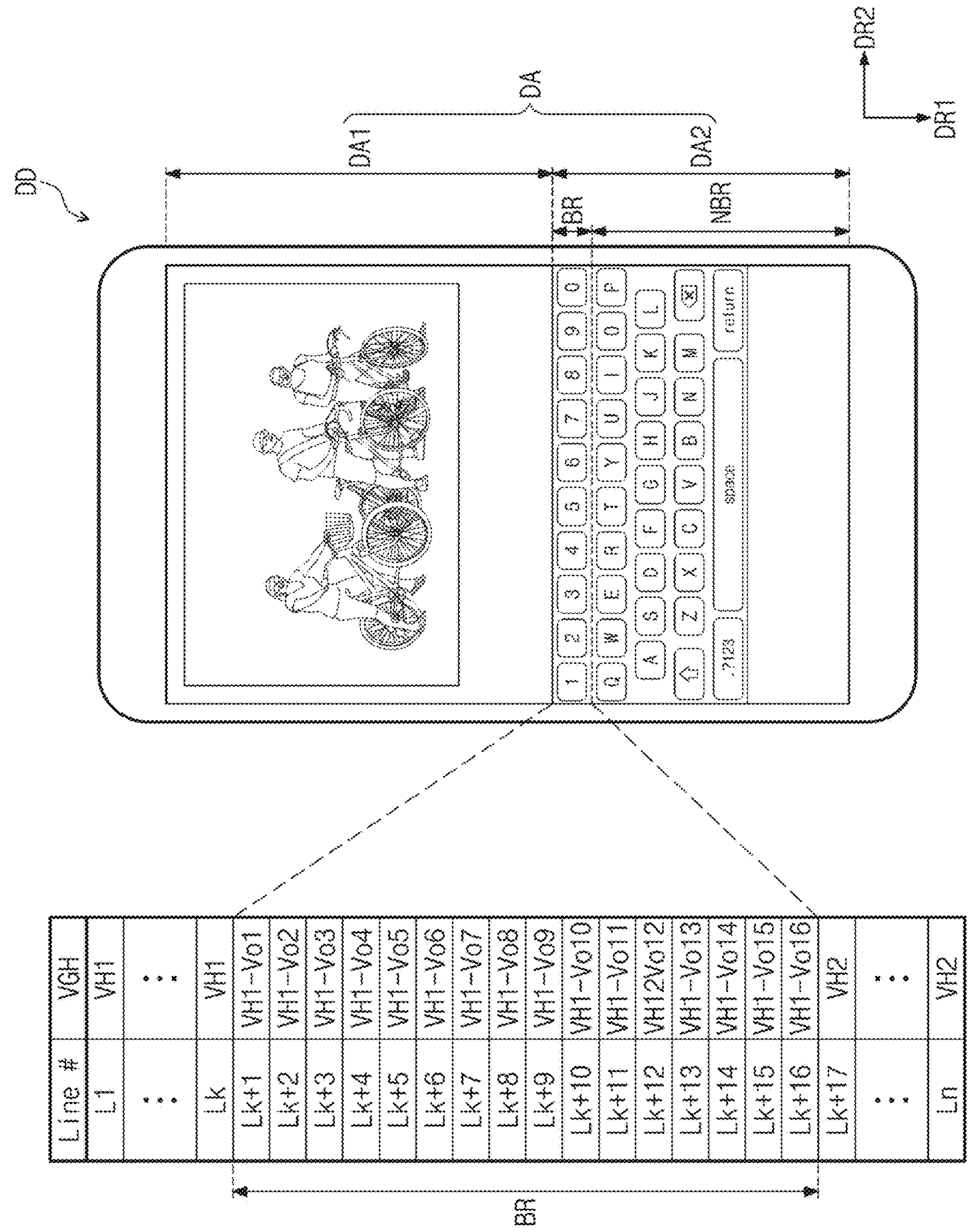
FIG. 14B is a view illustrating a voltage level of a first voltage at a boundary region of a second display region.

FIG. 14B is a view illustrating a voltage level of a first voltage at the boundary region of the second display region DA2.

Referring to FIG. 14B, the display region DA of the display device DD may include a first horizontal line L1 to an n-th horizontal line Ln of pixels PX. For example, the pixels PX of the first horizontal line L1 may be connected to the scan lines GIL1, GCL1, GWL1, and GWL2 and the light emitting control line EML1, as illustrated in FIG. 4. In addition, pixels PX of the j-th horizontal line Lj may be connected to scan lines GILj, GCLJ, GWLj, and GWLj+1, and the light emitting control lines EMLj, as illustrated in FIG. 4.

The first display region DA1 may include the first horizontal line L1 to a k-th horizontal line Lk, and the second display region DA2 may include from the (k+1)-th horizontal line Lk+1 to the n-th horizontal line Ln. 'Y' number of horizontal lines (Y is a positive integer; that is, lines ranging to the (k+Y)-th horizontal line Lk+Y from the (k+1)-th horizontal line Lk+1), which are adjacent to the first display region DA1, in the second display region DA2, are in a region for stress boundary diffusion, which is referred to as the boundary region BR. In the following example description, the number 'Y' of horizontal lines included in the boundary region BR is 16, but the present disclosure is not limited thereto. The boundary region BR may include lines ranging to a (k+16)-th horizontal line Lk+16 from the (k+1)-th horizontal line Lk+1. In addition, although FIG. 14B illustrates that the boundary region BR is included in the second display region DA2, the present disclosure is not limited thereto. For another example, the boundary region BR may include a portion of the first display region DA1 and a portion of the second display region DA2. According to an embodiment, the boundary region BR may include only a portion of the second display region DA2.

As illustrated in FIGS. 14A and 14B, when the first display region DA1 is driven during the multi-frequency mode MFM, the first voltage VGH may be in the first high voltage level VH1.

When the non-boundary region NBR of the second display region DA2 is driven at the second frame F2 to the 120-th frame F120 in the multi frequency mode MFM, the first voltage VGH may be in the second high voltage level VH2, and the second voltage VGL may be in the second low voltage level VL2.

When the boundary region BR of the second display region DA2 is driven at the second frame F2 to the 120-th frame F120 in the multi frequency mode MFM, the level of the first voltage VGH may be a third high voltage level which is lower than the first high voltage level VH1, and higher than the second high voltage level VH2.

When lines ranging from the (k+1)-th horizontal line Lk+1 to (k+16)-th horizontal line LK+16, the first voltage VGH may have equal levels or mutually different levels.

According to an embodiment, when the (k+1)-th horizontal line Lk+1 is driven, the third high voltage level of the first voltage VGH is VH1−Vo1. When the (k+2)-th horizontal line Lk+2 is driven, the third high voltage level of the first voltage VGH is VH1−Vo2. When the (k+16)-th horizontal line Lk+16 is driven, the third high voltage level of the first voltage VGH is VH1−Vo16.

When the first high voltage level VH1 and the second high voltage level VH2 have the relationship of VH1>VH2, offset voltages Vo1 to Vo16 may have the relationship of Vo1<Vo2<Vo3< . . . <Vo16. According to an embodiment, each of the offset voltages Vo1 to Vo16 may be equal to or greater than 0, and the third high voltage level VH1−Vo16 may be equal to or higher than the second high voltage level VH2.

Although FIG. 14B illustrates only the third high voltage level of the first voltage VGH at the boundary region BR, even a third low voltage level of the second voltage VGL may be set in the same manner. In other words, the third low voltage level of each of the (k+1)-th horizontal line Lk+1 to the (k+16)-th horizontal line Lk+16 corresponding to the boundary region BR may be set to a voltage level higher than the first low voltage level VL1 and lower than the second low voltage level VL2.

According to an embodiment, when the (k+1)-th horizontal line Lk+1 is driven, the third low voltage level of the second voltage VGL is VL1+Vo1. When the (k+2)-th horizontal line Lk+2 is driven, the third low voltage level of the second voltage VGL is VL1+Vo2. When the (k+16)-th horizontal line Lk+16 is driven, the third high voltage level of the second voltage VGL is VL1+Vo16.

According to an embodiment, the offset voltages Vo1 to Vo16 in the third high voltage level may be equal to the offset voltages Vo1 to Vo16 in the third low voltage level, respectively, but the present disclosure is not limited thereto. The offset voltages Vo1 to Vo16 in the third high voltage level may differ from the offset voltages Vo1 to Vo16 in the third low voltage level in another embodiment.

As illustrated in FIGS. 13A and 13B, when the pulse width of each of the scan signals GI1 to GIn and GC1 to GCn is greater than the pulse width of one horizontal period 1H, some of offset voltages Vo1 to Vo16 may be 0V. As illustrated in FIGS. 13A and 13B, since each of the scan signals GI1 to Gin and GC1 to GCn has the pulse width of 7H, the offset voltages Vo1 to Vo7 may be 0V.

Figure 15:
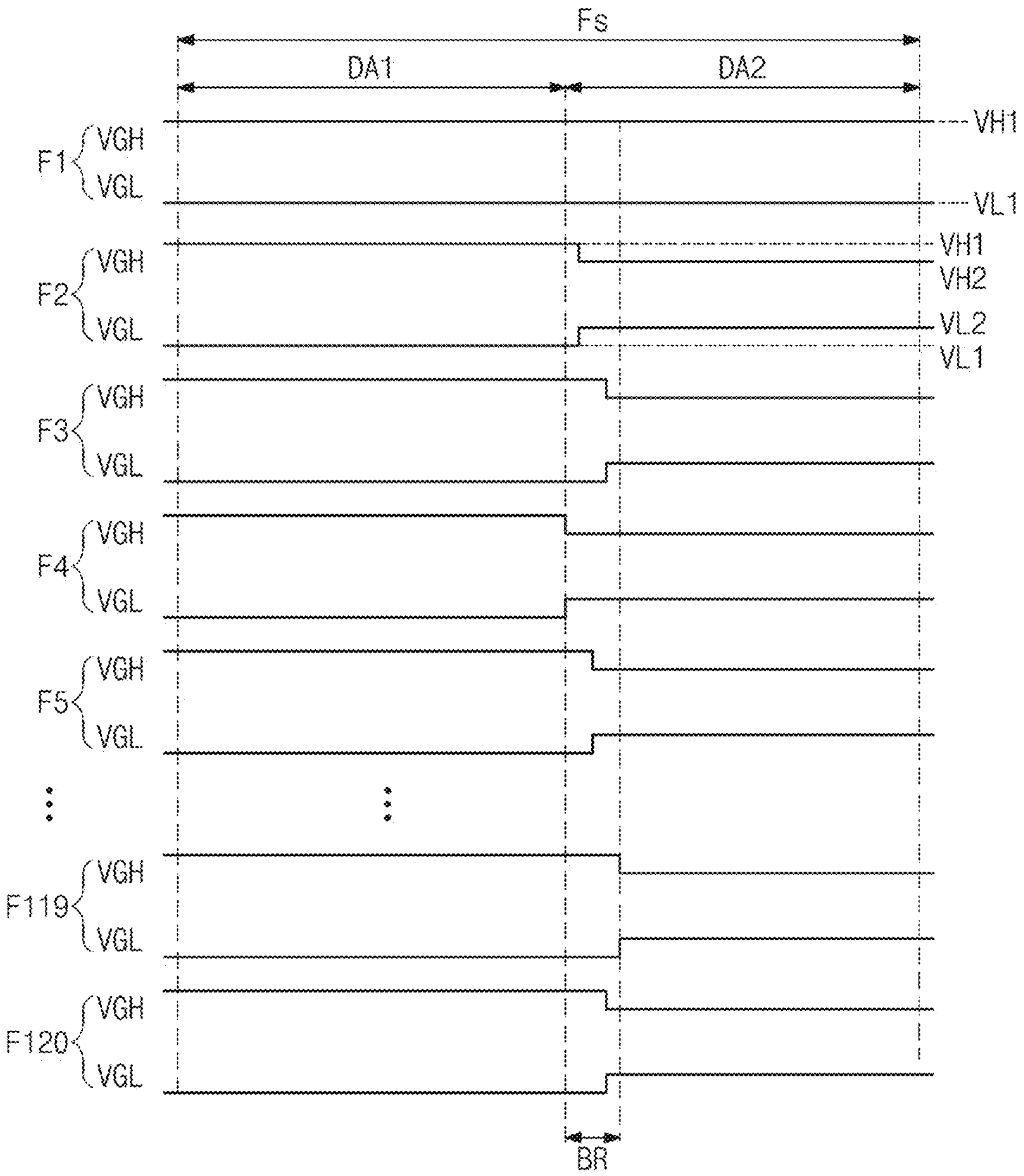
FIG. 15 is a view illustrating voltage level change of a first voltage and a second voltage non-driving duration in a multi-frequency mode.

FIG. 15 is a view illustrating voltage level change of the first voltage VGH and the second voltage VGL in a multi-frequency mode.

Referring to FIGS. 4, 7, 8, 14, and 15, the second display region DA2 includes the boundary region BR and the non-boundary region NBR. The boundary region BR may include a region, which is adjacent to the first display region DA1, of the second display region DA2.

Voltage levels of the first voltage VGH and the second voltage VGL provided from the voltage generator 300 to the scan driving circuit SDC may be changed during one frame Fs in the multi-frequency mode MFM.

For example, when the first display region DA1 is driven at the first frame F1 which corresponds to the driving duration DRP, the first voltage VGH may be in the first high voltage level VH1, and the second voltage VGL may be in the first low voltage level VL1.

The second frame F2 to the 120-th frame F120 are non-driving duration NDRP in which the second display region DA2 is not driven. When the first display region DA1 is driven at each of the second frame F2 to the 120-th frame F120, the first voltage VGH is changed from the first high voltage level VH1 to the second high voltage level VH2, and the second voltage VGL may be changed from the first low voltage level VL1 to the second low voltage level VL2.

In this case, at each of the second frame F2 to the 120-th frame F120, variations are made in the time point at which the first voltage VGH is changed from the first high voltage level VH1 to the second high voltage level VH2, and the time point at which the second voltage VGL is changed from the first low voltage level VL1 to the second low voltage level VL2.

For example, when the starting position of the second display region DA2 correspond to the k-th scan lines GIk and GCk, at each of the second frame F2 to the 120-th frame F120, the time point at which the first voltage VGH is changed from the first high voltage level VH1 to the second high voltage level VH2, and the time point at which the second voltage VGL is changed from the first low voltage level VL1 to the second low voltage level VL2 may correspond to (k+A)-th scan lines GIk+A and GCk+A. In addition, at each of the second frame F2 to the 120-th frame F120, voltage level change positions 'A' of the first voltage VGH and the second voltage VGL may be varied.

For example, when the (k+4)-th scan lines GIk+4 and GCk+4 are driven at the second frame F2, the first voltage VGH may be changed from the first high voltage level VH1 to the second high voltage level VH2, and the second voltage VGL may be changed from the first low voltage level VL1 to the second low voltage level VL2.

For example, when the (k+9)-th scan lines GIk+9 and GCk+9 are driven at the third frame F3, the first voltage VGH is changed from the first high voltage level VH1 to the second high voltage level VH2, and the second voltage VGL may be changed from the first low voltage level VL1 to the second low voltage level VL2.

According to an embodiment, the voltage level change positions '(A' may be stored in a look-up table in the signal generator 120 illustrated in FIG. 10. In other words, the voltage level change positions 'A' corresponding to the second frame F2 to the 120-th frame F120 may be stored in the look-up table. The signal generator 120 may output the voltage control signal VCS, such that the voltage level of the first voltage VGH is changed from the first high voltage level VH1 to the second high voltage level VH2, and the voltage level of the second voltage VGL may be changed from the first low voltage level VL1 to the second low voltage level VL2, based on the look-up table, when the (k+A)-th scan lines GIk+A and GCk+A are driven at each of the second frame F2 to the 120-th frame F120.

According to an embodiment, the voltage level change position 'A' may be generated by a random number generator in the signal generator 120 illustrated in FIG. 10. In other words, the random number generator in the signal generator 120 may generate the voltage level change positions 'A', which are within a preset range, at each of the second frame F2 to the 120-th frame F120. The signal generator 120 may output the voltage control signal VCS, such that the voltage level of the first voltage VGH is changed from the first high voltage level VH1 to the second high voltage level VH2, and the voltage level of the second voltage VGL is changed from the first low voltage level VL1 to the second low voltage level VL2, based on the generated voltage level change position 'A', when the (k+A)-th scan lines GIk+A and GCk+A are driven at each of the second frame F2 to the 120-th frame F120. The voltage level change position 'A' is a positive integer equal to or less than 'Y'. The 'Y' is the number of horizontal lines of the boundary region BR.

As described above, a time point, at which the voltage levels of the first voltage VGH and the second voltage VGL are changed, may be varied at the boundary region BR, thereby preventing the display quality from being deteriorated due to the change in voltage level between the first voltage VGH and the second voltage VGL at the boundary region BR.

Figure 16:
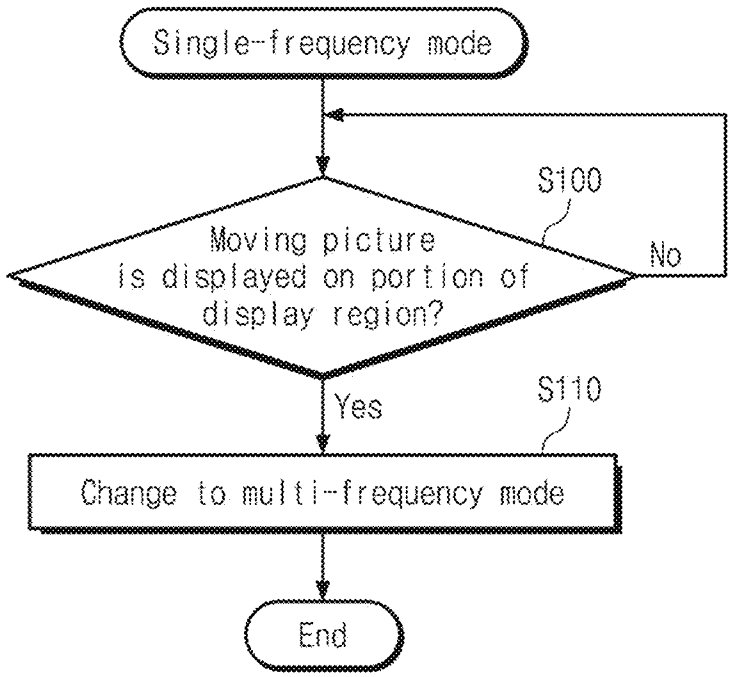
FIG. 16 is a flowchart illustrating an operation of a driving controller, according to an embodiment of the disclosure.

FIG. 16 is a flowchart illustrating an operation of a driving controller, according to an embodiment of the present disclosure.

Referring to FIGS. 4, 10, and 16, the operating mode determiner 110 of the driving controller 100 may set an operating mode to the single-frequency mode at an initialization stage (e.g., after powered up).

The operating mode determiner 110 determines the operating mode in response to the image signal RGB and the control signal CTRL. For example, when a portion (e.g., an image signal corresponding to the first display region DA1 (see FIG. 1)) of the image signal RGB during one frame is a moving picture, and another portion (e.g., an image signal corresponding to the second display region DA2 (see FIG. 1)) of the image signal RGB is a still image (S100), the operating mode determiner 110 changes an operating mode to a multi-frequency mode and outputs the mode signal MD corresponding the determined operating mode (S110). The mode signal MD may include not only information regarding whether the operating mode is the single-frequency mode or the multi-frequency mode, but also information on the first operating frequency for the first display region DA1 and the second operating frequency for the second display region DA2. In addition, the mode signal MD may include a starting position of the second display region DA2 and/or information on a boundary region of the second display region DA2.

The signal generator 120 outputs the output image signal DATA, the data control signal DCS, the light emitting control signal ECS, the scan control signal SCS, and the voltage control signal VCS in response to the input image signal RGB, the control signal CTRL, and the mode signal MD. The signal generator 120 may output the voltage control signal VCS, such that the first voltage VGH in the first high voltage level VH1 and the second voltage VGL in the first low voltage level VL1 are generated, when the mode signal MD indicates the single-frequency mode.

The voltage generator 300 generates the first voltage VGH in the first high voltage level VH1 and the second voltage VGL in the first low voltage level VL1, in response to the voltage control signal VCS from the driving controller 100.

Figure 17:
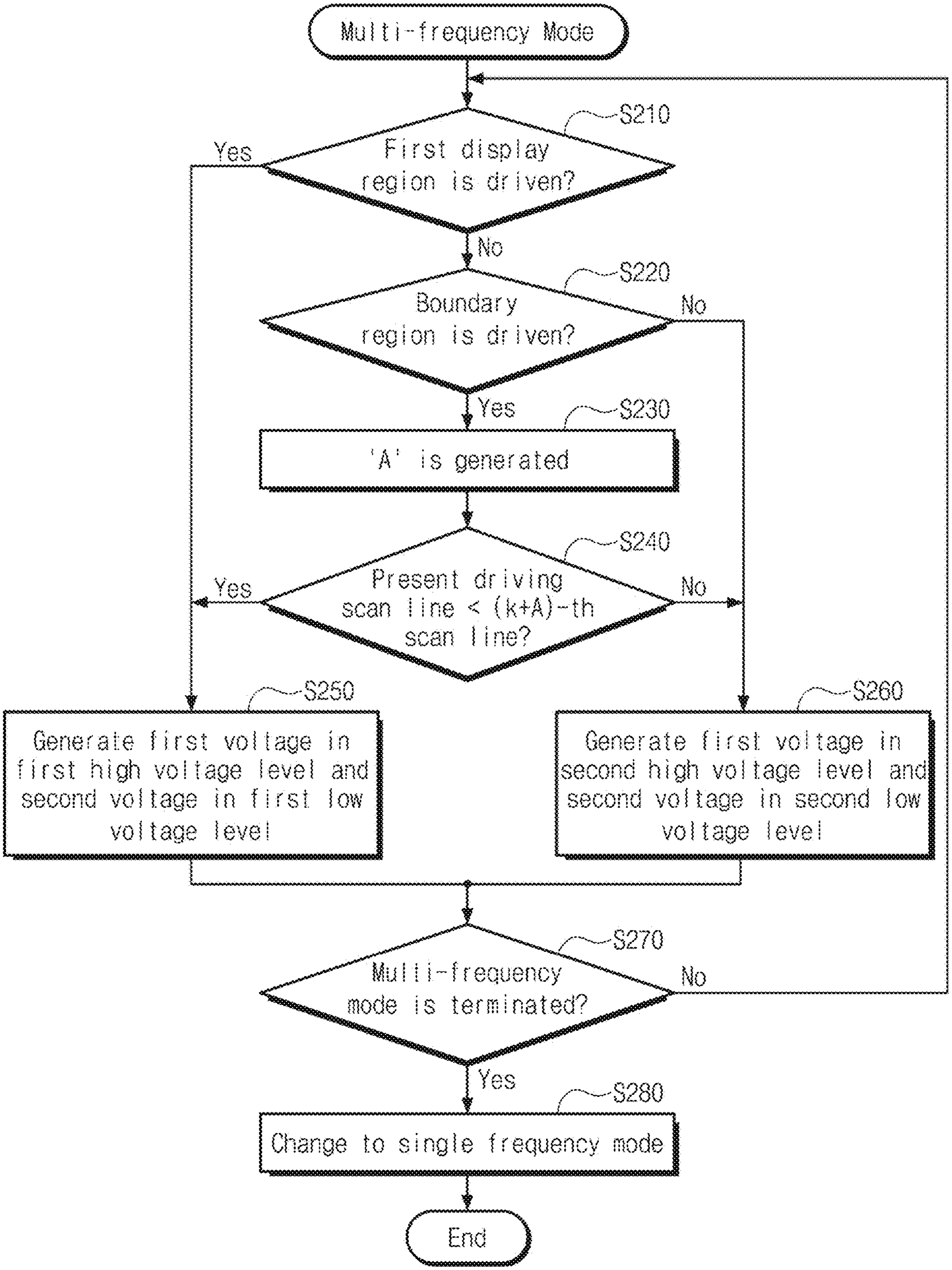
FIG. 17 is a flowchart illustrating an operation of a driving controller in a multi-frequency mode, according to an embodiment of the disclosure.

FIG. 17 is a flowchart illustrating an operation of a driving controller in the multi-frequency mode, according to an embodiment of the present disclosure.

Referring to FIGS. 4, 10, 15, and 17, during a multi-frequency mode, the first display region DA1 may be driven at the first operating frequency, and the second display region DA2 may be driven at the second operating frequency lower than the first operating frequency.

When the first display region DA1 is driven (S210), the driving controller 100 may output the voltage control signal VCS such that the first voltage VGH in the first high voltage level VH1 is generated, and the second voltage VGL in the first low voltage level VL1 is generated (S250).

The voltage generator 300 generates the first voltage VGH in the first high voltage level VH1 and the second voltage VGL in the first low voltage level VL1, in response to the voltage control signal VCS from the driving controller 100.

When the boundary region BR is driven (S220), the signal generator 120 generates the voltage level change position 'A'. As described above, the voltage level change position 'A' may be generated using the look-up table or the random number generator (S230).

When a present driving scan line is included in the boundary region BR and is positioned before the (k+A)-th scan line in the display panel (S240), the signal generator 120 may output the voltage control signal VCS, such that the first voltage VGH in the first high voltage level VH1 and the second voltage VGL in the first low voltage level VL1 are generated (S250). Here, k-th scan line in the display panel is the last scan line included in the first display region DA1. When the first horizontal line to the (A−1)-th horizontal line in the second display region DA2 are driven, the signal generator 120 may output the voltage control signal VCS, such that the first voltage VGH in the first high voltage level VH1 is generated, and the second voltage VGL in the first low voltage level VL1 is generated. Here, the first horizontal line in the second display region DA2 corresponds to (k+1)-th scan line in the display panel.

When the present driving scan line is included in the boundary region BR and greater than or equal to the (k+A)-th scan line in the display panel (S240), the signal generator 120 may output the voltage control signal VCS, such that the first voltage VGH in the second high voltage level VH2 and the second voltage VGL in the second low voltage level VL2 are generated (S260). When an A-th horizontal line to a n-th horizontal line in the second display region DA2 are driven, the signal generator 120 may output the voltage control signal VCS, such that the first voltage VGH in the second high voltage level VH2 is generated, and the second voltage VGL in the second low voltage level VL2 is generated.

When the present driving scan line is not included in the boundary region BR, that is, the non-boundary region NBR is driven (S220), the signal generator 120 may output the voltage control signal VCS, such that the first voltage VGH in the second high voltage level VH2 and the second voltage VGL in the second low voltage level VL2 are generated (S260).

The scan driving circuit SDC illustrated in FIG. 4 may generate scan signals GI1 to GIn and GC1 to GCn based on the first voltage VGH and the second voltage VGL. The scan signals GI1 to GIn and GC1 to GCn may be provided to relevant pixels PX of the display panel DP, respectively.

When the whole input image signals RGB during one frame correspond to the moving picture, the operating mode determiner 110 terminates the multi-frequency mod, and changes the operating mode to the single-frequency mode (S250). The operating mode determiner 110 may output the mode signal MD corresponding to the changed operating mode.

The display device having the above configuration may operate in the multi-frequency mode to drive the first display region at the first operating frequency, and to drive the second display region at the second operating frequency during the multi-frequency mode. When the first display region is driven in the multi-frequency mode, the first voltage and the second voltage provided to the scan driving circuit may be in the first high voltage level and the first low voltage level. When the second display region is driven in the multi-frequency mode, the first voltage and the second voltage provided to the scan driving circuit may be in the second high voltage level lower than the first high voltage level and the second low voltage level higher than the first low voltage level. Therefore, the power consumption of the scan driving circuit may be minimized in the multi-frequency mode.

In particular, the first voltage and the second voltage provided to the scan driving circuit in the boundary region of the second display region may be in the third high voltage level, which is between the first high voltage level and the second high voltage level, and the third low voltage level which is between the first low voltage level and the second low voltage level. Therefore, the display quality may be prevented from being deteriorated due to the changed voltage level of the first voltage and the second voltage in the boundary region between the first display region and the second display region.

Although described above with reference to the embodiments, it will be understood by those skilled in the art that various modifications and changes may be made in the present disclosure without departing from the spirit and scope of the invention as set forth in the claims below. Furthermore, the embodiments of the present disclosure are not intended to limit the technical spirit of the invention. All technical spirits within the scope of the following claims and all equivalents thereof should be construed as being included within the scope of the invention.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels;

a driving controller, which receives an input image signal and a control signal, and outputs a voltage control signal;

a voltage generator, which generate a first voltage and a second voltage in response to the voltage control signal; and a scan driving circuit, which receives the first voltage and the second voltage and provides a plurality of scan signals to the plurality of pixels, wherein the display panel is divided into a first display region, which is driven at a first operating frequency, and a second display region, which is driven at a second operating frequency, wherein the second display region includes a boundary region adjacent to the first display region and a non-boundary region opposite to the first display region with respect to the boundary region, and wherein the driving controller outputs the voltage control signal, such that the first voltage in a first high voltage level and the second voltage in a first low voltage level are generated when the first display region is driven, wherein the driving controller outputs the voltage control signal, such that the first voltage in a second high voltage level lower than the first high voltage level and the second voltage in a second low voltage level higher than the first low voltage level are generated, when the non-boundary region of the second display region is driven, and wherein the driving controller outputs the voltage control signal to generate the first voltage in a third high voltage level between the first high voltage level and the second high voltage level, and the second voltage in a third low voltage level between the first low voltage level and the second low voltage level, when the boundary region of the second display region is driven.

2. The display device of claim 1, wherein the scan driving circuit outputs the plurality of scan signals swinging between the first voltage and the second voltage, when the first display region is driven.

3. The display device of claim 1, wherein the scan driving circuit outputs the plurality of scan signals in the third low voltage level when the boundary region of the second display region is driven, and outputs the plurality of scan signals in the second low voltage level, when the non-boundary region of the second display region is driven.

4. The display device of claim 1, wherein the boundary region includes 'Y' number of horizontal lines of pixels of the plurality of pixels from a first horizontal line to a Y-th horizontal line disposed sequentially from a position adjacent to the first display region, and 'Y' is a positive integer, and wherein the third high voltage level of the first voltage is provided in plurality, the third low voltage level of the second voltage is provided in plurality, the driving controller outputs the voltage control signal to generate the first voltage having the third high voltage levels mutually different from each other from the first horizontal line to the Y-th horizontal line, and the second voltage having the third low voltage levels mutually different from each other from the first horizontal line to the Y-th horizontal line.

5. The display device of claim 4, wherein the third high voltage levels of the first voltage are decreased stepwise from the first horizontal line to the Y-th horizontal line.

6. The display device of claim 4, wherein the third low voltage levels of the second voltage are increased stepwise from the first horizontal line to the Y-th horizontal line.

7. The display device of claim 4, wherein the first horizontal line to the Y-th horizontal line correspond to Y number of offset voltages, respectively, and wherein the third high voltage levels from the first horizontal line to the Y-th horizontal line each correspond to difference between the first high voltage level and a corresponding offset voltage of the Y number of offset voltages.

8. The display device of claim 7, wherein some offset voltages of the Y number of offset voltages correspond to 0 volt (V).

9. The display device of claim 1, wherein the driving controller includes:

an operating mode determiner, which determines an operating mode based on the input image signal and the control signal, and outputs a mode signal; and a signal generator, which outputs an output image signal and the voltage control signal, in response to the input image signal, the control signal, and the mode signal.

10. The display device of claim 9, wherein the signal generator outputs a scan control signal to drive scan signals, which correspond to the first display region, of the plurality of scan signals at the first operating frequency, and to drive scan signals, which correspond to the second display region, of the plurality of scan signals at the second operating frequency, when the mode signal indicates a multi-frequency mode, and wherein the scan driving circuit provides the plurality of scan signals to the plurality of pixels, in response to the scan control signal.

11. A display device comprising:

a display panel including a plurality of pixels;

a driving controller, which receives an input image signal and a control signal, and to output a voltage control signal;

a voltage generator, which generates a first voltage and a second voltage in response to the voltage control signal; and a scan driving circuit, which receives the first voltage and the second voltage and provides a plurality of scan signals to the plurality of pixels, wherein the display panel is divided into a first display region driven at a first operating frequency and a second display region driven at a second operating frequency, wherein the driving controller outputs the voltage control signal, to generate the first voltage in a first high voltage level and the second voltage in a first low voltage level, when the first display region is driven, wherein the driving controller outputs the voltage control signal, to generate the first voltage in the first high voltage level and the second voltage in the first low voltage level, when a first horizontal line to an A-th horizontal line of pixels of the plurality of pixels in the second display region are driven, wherein the driving controller outputs the voltage control signal, to generate the first voltage in a second high voltage level and the second voltage in a second low voltage level, when an (A+1)-th horizontal line to an n-th horizontal line in the second display region are driven, and wherein 'A' is a positive integer and changes at every frame, 'n' is a positive integer, and $A<n$.

12. The display device of claim 11, wherein the scan driving circuit outputs the plurality of scan signals swinging between the first voltage and the second voltage, when the first display region is driven.

13. The display device of claim 11, wherein the second high voltage level is lower than the first high voltage level, and wherein the second low voltage level is higher than the first low voltage level.

14. The display device of claim 11, wherein the driving controller includes:

an operating mode determiner, which determines an operating mode based on the input image signal and the control signal, and outputs a mode signal; and a signal generator, which outputs an output image signal, and the voltage control signal, in response to the input image signal, the control signal, and the mode signal.

15. The display device of claim 14, wherein the second display region includes a boundary region adjacent to the first display region and a non-boundary region opposite to the first display region with respect to the boundary region.

16. The display device of claim 15, wherein the signal generator includes a random number generator to generate the 'A', and wherein the boundary region includes the 'n' number of horizontal lines.

17. The display device of claim 15, wherein the signal generator includes a look-up table to store the 'A' corresponding to each of a plurality of frames, and wherein the boundary region includes the 'n' number of horizontal lines.

18. A method for driving a display device, the method comprising:

driving a first display region of a display panel at a first operating frequency during a multi-frequency mode, and driving a second display region adjacent to the first display region at a second operating frequency during the multi-frequency mode;

generating a first voltage in a first high voltage level and a second voltage in a first low voltage level, when the first display region is driven;

generating the first voltage in the first high voltage level and the second voltage in the first low voltage level, when a first horizontal line to an A-th horizontal line of pixels in the second display region are driven;

generating the first voltage in a second high voltage level and the second voltage in a second low voltage level, when an (A+1)-th horizontal line to an n-th horizontal line in the second display region are driven;

generating a scan signal based on the first voltage and the second voltage; and providing the scan signal to the display panel, wherein the 'A' is a positive integer and changes at every frame, 'n' is a positive integer, and $A<n$.

19. The method of claim 18, wherein the second high voltage level is lower than the first high voltage level, and the second low voltage level is higher than the first low voltage level.

20. The method of claim 18, wherein the second display region includes a boundary region adjacent to the first display region and a non-boundary region opposite to the first display region with respect to the boundary region, and wherein the boundary region includes the 'n' number of horizontal lines.

* * * * *